US011568265B2

United States Patent
Taylor et al.

(10) Patent No.: US 11,568,265 B2
(45) Date of Patent: Jan. 31, 2023

(54) CONTINUAL SELECTION OF SCENARIOS BASED ON IDENTIFIED TAGS DESCRIBING CONTEXTUAL ENVIRONMENT OF A USER FOR EXECUTION BY AN ARTIFICIAL INTELLIGENCE MODEL OF THE USER BY AN AUTONOMOUS PERSONAL COMPANION

(71) Applicant: Sony Interactive Entertainment Inc., Tokyo (JP)

(72) Inventors: Michael Taylor, San Mateo, CA (US); Javier Fernandez-Rico, San Mateo, CA (US); Sergey Bashkirov, San Mateo, CA (US); Jaekwon Yoo, San Mateo, CA (US); Ruxin Chen, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 895 days.

(21) Appl. No.: 15/684,830

(22) Filed: Aug. 23, 2017

(65) Prior Publication Data
US 2019/0065960 A1    Feb. 28, 2019

(51) Int. Cl.
G06N 3/08    (2006.01)
G06N 3/00    (2006.01)
G06N 20/00    (2019.01)

(52) U.S. Cl.
CPC ............ *G06N 3/086* (2013.01); *G06N 3/008* (2013.01); *G06N 20/00* (2019.01)

(58) Field of Classification Search
CPC ......... G06N 3/086; G06N 20/00; G06N 3/008
See application file for complete search history.

(56) References Cited

U.S. PATENT DOCUMENTS 8,918,208 B1 *  12/2014  Hickman ............ G06F 16/5866
                                                        700/1
2009/0210368 A1 *  8/2009  Deo ..................... G06K 9/6267
                                                        706/20

(Continued)

FOREIGN PATENT DOCUMENTS

EP          3163545 A1    3/2017
WO    WO 2016142351 A1    9/2016

OTHER PUBLICATIONS

Ujjwalkarn, "A Quick Introduction to Neural Networks," The Data Science Blog, available at https://ujjwalkarn.me/2016/08/09/quick-intro-neural-networks/ (2016) (last accessed Jun. 9, 2020). (Year: 2016).*

(Continued)

*Primary Examiner* — Kamran Afshar
*Assistant Examiner* — Ryan C Vaughn
(74) *Attorney, Agent, or Firm* — Penilla IP, APC

(57) ABSTRACT

An autonomous personal companion executing a method including capturing data related to user behavior. Patterns of user behavior are identified in the data and classified using predefined patterns associated with corresponding predefined tags to generate a collected set of one or more tags. The collected set is compared to sets of predefined tags of a plurality of scenarios, each to one or more predefined patterns of user behavior and a corresponding set of predefined tags. A weight is assigned to each of the sets of predefined tags, wherein each weight defines a corresponding match quality between the collected set of tags and a corresponding set of predefined tags. The sets of predefined tags are sorted by weight in descending order. A matched scenario is selected for the collected set of tags that is associated with a matched set of predefined tags having a corresponding weight having the highest match quality.

22 Claims, 18 Drawing Sheets

(56) References Cited

U.S. PATENT DOCUMENTS

| | | |
|---|---|---|
| 2010/0298976 A1 | 11/2010 | Sugihara et al. |
| 2013/0280985 A1 | 10/2013 | Klein |
| 2015/0088310 A1* | 3/2015 | Pinter .................. G06Q 50/22 901/1 |
| 2017/0028551 A1* | 2/2017 | Hemken ................. B25J 9/163 |
| 2017/0270919 A1* | 9/2017 | Parthasarathi .......... G10L 15/02 |
| 2018/0293988 A1* | 10/2018 | Huang ................... G10L 17/20 |

OTHER PUBLICATIONS

Stiehl et al., "The Huggable: A Platform for Research in Robotic Companions for Pediatric Care," in Proc. 8th Int'l Conf. Interaction Design and Children 317-20 (2009). (Year: 2009).*

AVILeS Parrales, Olga_PCT Notification of Transmittal of the International Search report and the Written Opinion of the International Searching Authority, or the Declaration_PCT/US2018/041701_ Oct. 5, 2018_16 pages.

* cited by examiner

CONTINUAL SELECTION OF SCENARIOS BASED ON IDENTIFIED TAGS DESCRIBING CONTEXTUAL ENVIRONMENT OF A USER FOR EXECUTION BY AN ARTIFICIAL INTELLIGENCE MODEL OF THE USER BY AN AUTONOMOUS PERSONAL COMPANION

TECHNICAL FIELD

The present disclosure is related to intelligent robots, and more specifically to an automated companion personalized to a user that is implemented within an autonomous robot, and is also related to the building and implementation of the companion through artificial intelligence.

BACKGROUND OF THE DISCLOSURE

Robots are here. They are ready to interact with their human owners for a variety of reasons. These robots continue in a long line of robotic assistants, including robotic pets that were designed to provide companionship to their owners. Despite their limited processing power and restricted form factors, these early robotic pets could still move around somewhat autonomously, sense the immediate environment, have programmable intelligence for performing tasks, and interact (e.g., speak, bark, touch, etc.) with their human owners. These early robotic pets featured computer capabilities, vision sensor systems, and articulators to facilitate one or more features, such as intelligence, object sensing, personality, and movement. For example, these robotic pets could interact with objects (e.g., ball), communicate with their owners, interact with their environment, play with its owners, travel about, etc. Also, these robotic pets could be programmed to participate in robot soccer leagues. Moreover, these robotic pets could grow and mature as the owners raised them through interaction. Also, these robotic pets could form personalities based on how they were raised.

These early robots are ready to reach the next level of capabilities to include, in part, increased intelligence, awareness, assistance, interaction, personality, and movement.

It is in this context that embodiments of the disclosure arise.

SUMMARY

Embodiments of the present disclosure relate to systems and methods for an autonomous personal companion implemented as an artificial intelligence (AI). In accordance with one embodiment of the present disclosure, the AI makes use of a model trained via a deep learning engine on information that has been identified as contextually relevant to a user with the goal of providing personalized assistance to the user. In one embodiment, the trained model acts a behavior selection strategy for the AI. The AI can be configured to be aware of and exchange data with other digital assets (e.g., phone contacts, calendar, phone, home automation, gaming console, etc.) operating under different proprietary operating systems. The AI can be integrated into a mobile platform and configured to move autonomously to position itself to best receive data, collect data, sense the environment, and deliver data. The AI can interact with a back-end server for processing, wherein the AI can process requests at a local level, or pre-process requests at a local level and then fully process those requests at the back-end server. In addition, embodiments are related to the contextualization of captured information related to a user (e.g., audio and visual data of the user and/or the environment within which the user is located), wherein the captured information is classified into a set of tags, wherein the tags are matched to previously defined learned patterns, and the combination associated with a scenario. An algorithm associated with the matched scenario is then executed given certain input data (e.g., the captured information) to generate the outward behavior of the AI as implemented through the personal companion.

In one embodiment, a method for applying an AI model of a user by an autonomous personal companion is performed. The method includes capturing data related to behavior of a user using an autonomous personal companion providing services to the user. The method includes analyzing the data to identify one or more patterns of user behavior in the data from a plurality of learned or predefined patterns. The identified patterns of behavior give an insight as to the contextual environment of the user. Each of the plurality of learned or predefined patterns is associated with a corresponding predefined tag. The plurality of learned or predefined patterns is generated from a deep learning engine. The method includes classifying the identified patterns as a collected set of tags, wherein tags in the collected set are associated with the one or more identified patterns. The method includes comparing the collected set of tags to each of a plurality of sets of predefined tags associated with a plurality of scenarios, wherein each scenario corresponds to one or more predefined patterns of behavior and a corresponding set of predefined tags. The method includes assigning a weight to each of the sets of predefined tags based on the comparing, wherein each weight defines a corresponding match quality between the collected set of tags and a corresponding set of predefined tags. The method includes sorting the plurality of sets of predefined tags by corresponding weights in descending order. The method includes selecting a matched scenario to the collected set of tags that is associated with a matched set of tags having a corresponding weight having the highest match quality. A matched algorithm of the matched scenario can be executed given the captured data to determine an outward behavior of the AI of the autonomous personal companion, which can be used to respond to the captured data.

In another embodiment, a non-transitory computer-readable medium storing a computer program for applying an AI model of a user by an autonomous personal companion is disclosed. The computer-readable medium includes program instructions for capturing data related to behavior of a user using the autonomous personal companion providing services to the user. The computer-readable medium includes program instructions for analyzing the data to identify one or more patterns of user behavior in the data from a plurality of learned or predefined patterns. The identified patterns of behavior give an insight as to the contextual environment of the user. Each of the plurality of learned patterns is associated with a corresponding predefined tag. The plurality of learned patterns is generated from a deep learning engine. The computer-readable medium includes program instructions for classifying the identified patterns as a collected set of tags, wherein tags in the collected set are associated with the one or more identified patterns. The computer-readable medium includes program instructions for comparing the collected set of tags to each of a plurality of sets of predefined tags associated with a plurality of scenarios, wherein each scenario corresponds to one or more predefined patterns of behavior and a correspond set of predefined tags. The computer-readable medium includes program instructions for assigning a weight to each of the sets of predefined tags based on the comparing, wherein each weight defines a corresponding match quality between the collected set of tags and a corresponding set of predefined tags. The computer-readable medium includes program instructions for sorting the plurality of sets of predefined tags by corresponding weights in descending order. The computer-readable medium includes program instructions for selecting a matched scenario to the collected set of tags that is associated with a matched set of tags having a corresponding weight having the highest match quality. A matched algorithm of the matched scenario can be executed given the captured data to determine an outward behavior of the AI as implemented through the personal companion, which can be used to respond to the captured data.

In still another embodiment, a computer system is disclosed, wherein the computer system includes a processor and memory coupled to the processor and having stored therein instructions that, if executed by the computer system, cause the computer system to execute a method for applying an AI model of a user by an autonomous personal companion. The method as executed by the computer system includes capturing data related to behavior of a user using the autonomous personal companion providing services to the user. The method includes analyzing the data to identify one or more patterns of user behavior in the data from a plurality of learned or predefined patterns. The identified patterns of behavior give an insight as to the contextual environment of the user. Each of the plurality of learned or predefined patterns is associated with a corresponding predefined tag. The plurality of learned or predefined patterns is generated from a deep learning engine. The method includes classifying the identified patterns as a collected set of tags, wherein tags in the collected set are associated with the one or more identified patterns. The method includes comparing the collected set of tags to each of a plurality of sets of predefined tags associated with a plurality of scenarios, wherein each scenario corresponds to one or more predefined patterns of behavior and a correspond set of predefined tags. The method includes assigning a weight to each of the sets of predefined tags based on the comparing, wherein each weight defines a corresponding match quality between the collected set of tags and a corresponding set of predefined tags. The method includes sorting the plurality of sets of predefined tags by corresponding weights in descending order. The method includes selecting a matched scenario to the collected set of tags that is associated with a matched set of tags having a corresponding weight having the highest match quality. A matched algorithm of the matched scenario can be executed given the captured data to determine an outward behavior of the AI as implemented through the personal companion, which can be used to respond to the captured data Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which.

DETAILED DESCRIPTION

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe systems and methods implementing deep learning (also referred to as machine learning) techniques to build an AI model personalized to a user. As such, the personal companion is implemented as an AI, wherein the AI makes use of a model trained via a deep learning engine on information that has been identified as contextually relevant to a user with the goal of providing personalized assistance to the user. The trained model can act as a behavior selection strategy for the AI. The AI model is implemented through an autonomous personal companion that is mobile. The AI can be configured to be aware of and exchange data with other digital assets operating under different proprietary platforms. The AI can be integrated within the mobile platform to move autonomously through an environment to best receive data, collect data, sense the environment, deliver data, to best sense and/or map the environment, as well as other features. In some implementations, the autonomous personal companion is configurable to interact with a back-end server for processing, wherein the AI can process requests at the local level, or pre-process requests at the local level, and then fully process those requests at the back-end server. Furthermore, various embodiments of the present disclosure provide for the contextualization of captured information related to a user, such as audio and visual data of the user and/or the environment within which the user is located. In particular, the captured information is classified through tags, and the tags are then matched to previously defined learned patterns that are associated with a matched scenario. An algorithm associated with the matched scenario is then executed given certain input data (e.g., the captured information) to generate a result (e.g., an outward behavior of the AI), which when performed responds to the input data.

Figure 1A:
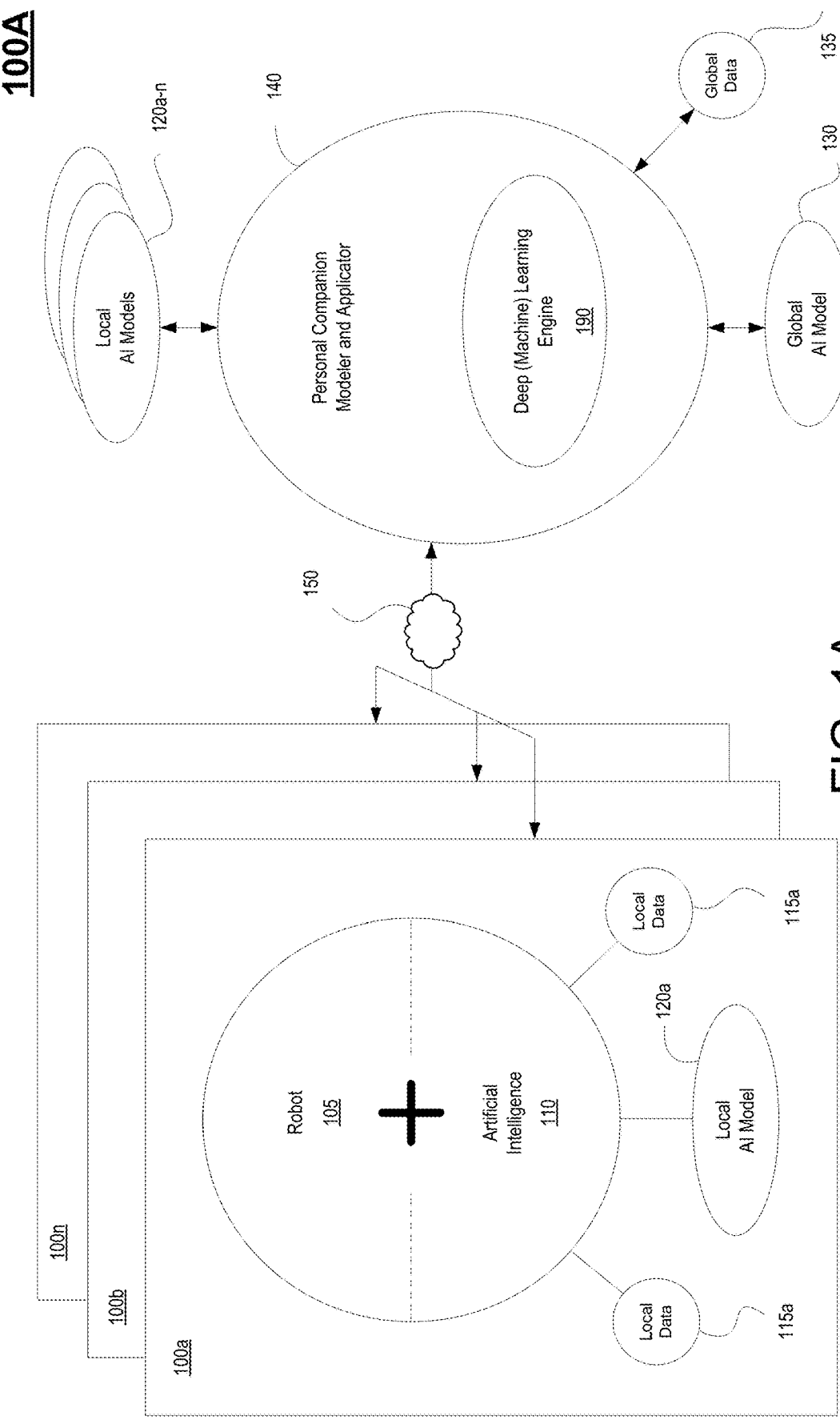
FIG. 1A is an illustration of an autonomous personal companion implemented through an artificial intelligence (AI) model of a user, in accordance with one embodiment of the present disclosure.

With the above general understanding of the various embodiments, example details of the embodiments will now be described with reference to the various drawings. FIG. 1A illustrates a system 100A used for building and implementing autonomous personal companions that are implemented through corresponding AI models of users, in accordance with embodiments of the present disclosure. In particular, an autonomous personal companion 100 is configured to interface with a corresponding user as a digital companion, for example to provide services to the user. In addition, the autonomous personal companion 100 may be supported by a back-end server (e.g., personal companion modeler and applicator 140) through a network 150 (e.g., internet), wherein the back-end server provides artificial intelligence and/or deep, machine learning (e.g., through the deep machine learning engine 190) for building and applying personalized AI models, each of which correspond to its respective user. For example, one or more companions 100a-100n are configured to support multiple users in one or more locations throughout the world.

Each autonomous personal companion 100 is configured to provide multiple capabilities that provide services for (e.g., support) its respective user. In general, the companion 100 may provide its services at the request of the user, or may autonomously provide services or offer services to the user at appropriate times (e.g., sensing a need by the user, or determining contextually relevant actions, random generation, etc.). For example, the autonomous personal companion 100 may be configured to provide digital assistance to the user, such as processing user search requests that perform various operations (e.g., search for information, purchase goods and/or services, etc.); autonomously generate search requests relevant to the user; autonomously generate actions that are contextually relevant to the user (e.g., purchasing potato chips through an electronic commerce vendor after noticing that the pantry is bare and a party was held the previous night); provide gaming assistance to the user playing a gaming application (e.g., providing tips and aids that are helpful in navigating through a corresponding gaming application); extend the displayed gaming space of a gaming application by integrating the three dimensional (3D) gaming space within the physical world, as well as other features.

In addition, the autonomous personal companion 100 may provide companionship to the user, such as hold a conversation with the user, provide digital assistance to the user, build a relationship with the user through conversations, and accompany the user throughout a period of time or multiple periods of time. The companion 100 may prompt the user to respond, much like a human or animal companion would. For example, the companion 100 may suggest beginning a game of cards to be played between the companion 100 and user, or may suggest watching digital content on a display (e.g., fixed display remote from or a display integrated with the companion 100), or may bring over a game controller to prompt the user to playing a gaming application.

At least some of the actions performed by the autonomous personal companion 100 are contextually relevant to the user. That is, because the companion 100 is contextually aware of the environment that the user is currently engaged in and is able to build and/or access an AI model that is personal to the user, the actions generated by the companion 100 can be tailored to a context within which the user is experiencing. For example, when the user makes a seemingly generic request (e.g., "What was the score last night?"), based on the AI model for the user and the current date, the companion 100 would determine the current context for that request and provide the appropriate and relevant response: "GOLDEN STATE WARRIORS® win 101-97." The response is contextually relevant, because the AI model defines the user as a fan of the GOLDEN STATE WARRIORS®, and the user only keeps up with the GOLDEN STATE WARRIORS® games in the NATIONAL BASKETBALL ASSOCIATION®. Further, the response is contextually relevant to the user because the AI model also defines the user as an NBA® fan in the month of April during playoffs, and one who is not concerned with any scores from other sports. Because the current date is one in April, the score for the GOLDEN STATE WARRIORS® from the night before can be searched through the internet by the companion 100.

As shown in FIG. 1A, numerous personal companions 100a-100n are configured to interface with corresponding users as their respective digital companions. For purposes of brevity and clarity, companion 100a is described, and the description is representative of the features provided in companions 100a-100n. In particular, each companion is implemented within a robot 105 that is mobile, wherein the robot may take on any suitable form factor. Each companion is supported through artificial intelligence 110 that may be distributed both locally in the robot 105 and at the back-end server 140. In one embodiment, AI 110 is configured for deep learning that is used to build at least a portion of a local AI model 120a used for providing, in part, services to a corresponding user. This information that is learned using AI 110 may or may not be shared with the back-end server 140 that may also be tasked with building the local AI model 120a depending on the type of information that is collected and/or learned. For example, sensitive information may be processed locally to build the local AI model 120a, but may not be shared with the back-end server 140.

In addition, the AI 110 of companion 100a includes a version of the local AI model 120a, wherein model 120a is personal to the corresponding user, and wherein AI 110 is configured for implementing the AI model 120a. In particular, the term "local AI model" is used to indicate that the AI model corresponds to a particular or localized user. The local AI model 120a stored within the form factor of robot 105 may be a full version of the AI model, or may be a base model that autonomously provides some subset of the capabilities available with the full version of the AI model. The full version of the AI model is also stored and accessible by the back-end server 140 providing AI modeling and application. As such, companion 100a may function independent of the back-end server 140, and provide either a full set of capabilities (if the full version of the local AI model is stored at robot 105), or a limited set of capabilities (if a lesser version of the local AI models is stored at robot 105). On the other hand, companion 100a may function in cooperation with the back-end server 140, and provide the full set of capabilities provided by the local AI model 120a. For example, the local AI model 120a at the robot 105 works cooperatively (e.g., may pre-process data) with the local AI model 120a at the back-end server 140 which is better configured (faster and more resources) to perform most of the AI processing.

As shown in FIG. 1A, local data 115a are collected by companion 100a, such as by robot 105. The local data 115a may be used by the AI 110 at the robot 105 to help build the local AI model 120a, using whatever AI capabilities are stored at robot 105. In addition, the local data 115a may be delivered to the personal companion modeler and applicator at the back-end server 140 to build the local AI model 120a, using the AI capabilities of the deep, machine learning engine 190 (e.g., implementing a nearest neighbor based tagging and scenario selection algorithm). As shown, one or more local AI models 120a-n are generated and stored at the back-end server 140 for supporting one or more users.

Because the local data 115 for each of the companions 100a-100n are delivered to the personal companion modeler and applicator at the back-end server, each of the local data may be aggregated to generate a global AI model 130. The aggregated local data may be stored as global data 135.

Figure 1B:
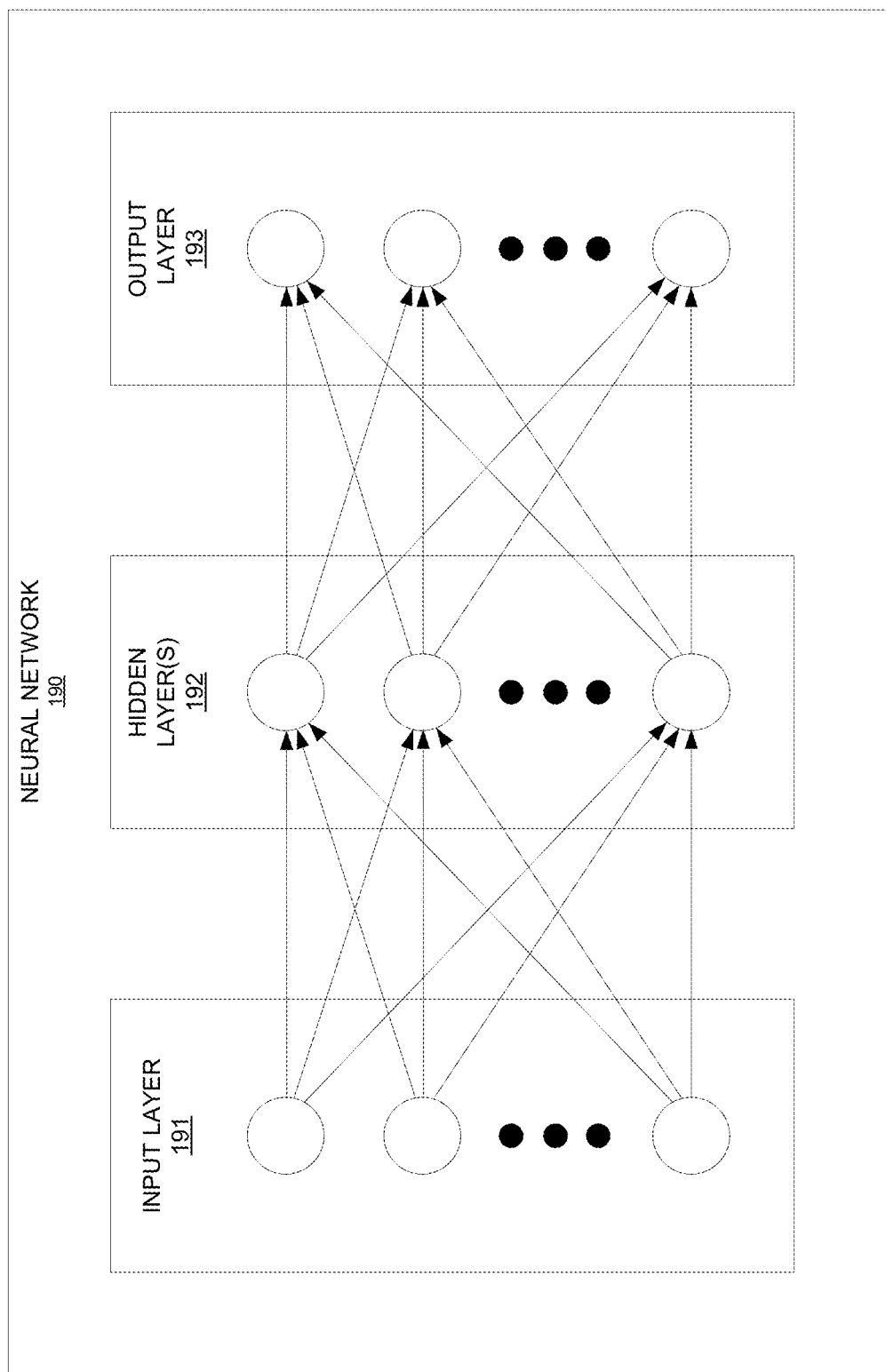
FIG. 1B illustrates an example neural network used to build an AI model of a user, wherein the AI model is used to implement an autonomous personal companion for a user, in accordance with one embodiment of the present disclosure.

FIG. 1B illustrates an example neural network used to build a local AI model for a corresponding user through training implemented by the deep learning engine 190 of the personal companion modeler and applicator 140, in accordance with one embodiment of the present disclosure. In one embodiment, deep learning engine 190 may be implemented to perform tag identification to classify user behavior. In particular, the modeler and applicator 140 in system 100A of FIG. 1A is configured to identify user behavior patterns and tag those patterns that may be useful and suitable for when the autonomous personal companion 100 provides services to the user. In addition, the neural network may be implemented within the AI 110 of companion 100, in one embodiment. The resulting local AI model 120 for the user defines, in part, the behaviors, biometrics, actions, emotions, expectations, desires, likes, wants, needs, and the environment (for providing context) of and relevant to the user. The personal companion modeler and applicator 140 may be any computing device, in particular, including a back-end server computing device that is coupled to each of the autonomous personal companions 100a-10On directly or through a network (e.g., local network, internet, etc.).

Specifically, the deep learning or machine learning engine 190 in the modeler 140 is configured to analyze local data 115 pertinent to the user, wherein the local data 115 are collected, in part, by the autonomous personal companion 100. The local data 115 are collected in association with monitoring the user (e.g., controller inputs, requests, actions, behaviors, responses, etc.), as well as the environment of the user. As will be described below, the companion 100 is configured with various features (e.g., camera, active actuators, passive sensors, controllers, mouse, scanners, etc.) that monitor and/or make a request for purposes of collecting data. Basically, any relevant information associated with the user may be collected and used, in part, to define the user, and to understand the context within which the user is present, and to predict how the user feels, will act or respond to various conditions and/or stimuli. As such, the deep learning engine 190 is able to classify information about the user so that a corresponding local AI model 120 can provide the best services for the user, and the services are provided with minimal input by the user. For example, the AI model 120 can be used (e.g., through implementation of the deep learning engine 190) to understand requests made by the user, to predict what the user will need or may want, and provide services that satisfy those requests and predictions.

In another embodiment, in addition to the local data 115, other data (e.g., global data 135) may be optionally utilized and/or collected by the plurality of personal companions 100a-n and also used in building the local AI model 120 for the corresponding user. Basically, the global data 135 are the aggregation of all the local data 115 collected for all the users. In particular, some data may be generic and suitable for use when building all AI models for all users, or at least some subset (of various sizes) of users. In addition, the global data 135 may be used to build a global AI model 130, that may be used generally for any user. Further, the global data 135 may be used to build various global AI models, each of which is targeted to a particular grouping of users (e.g., grouped through demographics, region, music tastes, schooling, etc.).

As such, the local data 115 and some portion of global data 135 are fed to the deep learning engine 190. The deep learning engine 190 utilizes artificial intelligence, including deep learning algorithms, reinforcement learning, or other artificial intelligence-based algorithms to build the local AI model 120 for the corresponding user.

In that manner, during the learning and/or modeling phase, the data are used by the deep learning engine 190 to predict the reactions, actions, wants, and/or needs for a given user given a set of input data. These reactions, actions, wants and/or needs may be generally classified as user behavior, and as such, the AI model 120 can be used to generally identify and/or classify behavior of a corresponding user given some input data, and provide an appropriate response for the AI (e.g., determine outward behavior of the AI as implemented through the personal companion). For example, the input data may be a specific request by the user, wherein the AI model 120 is used to generate a response, and wherein the response is related to services provided by the autonomous personal companion 100. In addition, the input data may be a collection of environmental data that, irrespective of any directed user input or request, may be used to predict the reactions, actions, wants and/or needs of the user to which the response is directed. For example, the AI model 120 may be used to predict what services the user may want and/or need without the user having to explicitly deliver a request.

Over time, the AI model 120 can identify and/or classify user behavior and apply the AI model to predict the behavior, actions, responses, wants and/or needs of a user in response to an approximate set of input data. For instance, tag identification and scenario selection may be used to identify and classify user behavior as tags, and provide an AI response that predicts the wants and/or needs of the user and provides services responsive to those wants and/or needs. For example, in the previously introduced example, a user is interested only in NBA scores in the month of April, and as such, any request for a sporting score of a game is used to predict the wants and needs of the user to include understanding that the user is a Golden State Warriors fan, and that in the month of April that user is only interested in scores from games played by the Warriors, all of which leads to a response (e.g., as implemented through the AI model 120) with the score for the latest game played by the Warriors. Other examples are useful in describing the building of the AI model 120. For example, the AI model 120 can be used to define certain biometrics of the user. In one case, the gait of the user can be defined, such that the personal companion can sense and track the footfall of an approaching person, and determine that it is the corresponding user associated with the AI model 120. The AI model 120 can be used to determine that at 5:00 pm, the user typically returns home, and sits down to watch digital content. As such, the personal companion 100 may upload content that is of interest to the user lately (e.g., binge watching a medical drama show) to a display already playing, or ready for play at the request of the user to the companion 100.

The neural network 190 represents an example of an automated analysis tool for analyzing data sets to determine the responses, actions, behavior, wants and/or needs of a corresponding user. Different types of neural networks 190 are possible. In an example, the neural network 190 supports deep learning that may be implemented by deep learning engine 190. Accordingly, a deep neural network, a convolutional deep neural network, and/or a recurrent neural network using supervised or unsupervised training can be implemented. In another example, the neural network 190 includes a deep learning network that supports reinforcement learning. For instance, the neural network 190 is set up as a Markov decision process (MDP) that supports a reinforcement learning algorithm.

Generally, the neural network 190 represents a network of interconnected nodes, such as an artificial neural network. Each node learns some information from data. Knowledge can be exchanged between the nodes through the interconnections. Input to the neural network 190 activates a set of nodes. In turn, this set of nodes activates other nodes, thereby propagating knowledge about the input. This activation process is repeated across other nodes until an output is provided.

As illustrated, the neural network 190 includes a hierarchy of nodes. At the lowest hierarchy level, an input layer 191 exists. The input layer 191 includes a set of input nodes. For example, each of these input nodes is mapped to local data 115 collected actively through actuators or passively by sensors during monitoring and/or querying of the user and the environment associated with the user by the autonomous personal companion 100.

At the highest hierarchical level, an output layer 193 exists. The output layer 193 includes a set of output nodes. An output node represents a decision (e.g., prediction) that relates to one or more components of a local AI model 120, for example. As previously described, the output nodes may identify the predicted or expected responses, actions, behaviors, wants and/or needs of the user for a given set of inputs, wherein the input may define various scenarios (e.g., direct requests, time of day, various patterns of behavior, etc.). These results can be compared to predetermined and true results obtained from previous interactions and monitoring of the user and/or environment in order to refine and/or modify the parameters used by the deep learning engine 190 to iteratively determine the appropriate predicted or expected responses, actions, behaviors, wants and/or needs of the user for a given set of inputs. That is, the nodes in the neural network 190 learn the parameters of the AI model 120 that can be used to make such decisions when refining the parameters.

In particular, a hidden layer 192 exists between the input layer 191 and the output layer 193. The hidden layer 192 includes "N" number of hidden layers, where "N" is an integer greater than or equal to one. In turn, each of the hidden layers also includes a set of hidden nodes. The input nodes are interconnected to the hidden nodes. Likewise, the hidden nodes are interconnected to the output nodes, such that the input nodes are not directly interconnected to the output nodes. If multiple hidden layers exist, the input nodes are interconnected to the hidden nodes of the lowest hidden layer. In turn, these hidden nodes are interconnected to the hidden nodes of the next hidden layer, and so on and so forth. The hidden nodes of the next highest hidden layer are interconnected to the output nodes. An interconnection connects two nodes. The interconnection has a numerical weight that can be learned, rendering the neural network 190 adaptive to inputs and capable of learning.

Generally, the hidden layer 192 allows knowledge about the input nodes to be shared among all the tasks corresponding to the output nodes. To do so, a transformation $f$ is applied to the input nodes through the hidden layer 192, in one implementation. In an example, the transformation $f$ is non-linear. Different non-linear transformations $f$ are available including, for instance, a linear rectifier function $f(x)=\max(0,x)$.

The neural network 190 also uses a cost function c to find an optimal solution. The cost function measures the deviation between the prediction that is output by the neural network 190 defined as f(x), for a given input x and the ground truth or target value y (e.g., the expected result). The optimal solution represents a situation where no solution has a cost lower than the cost of the optimal solution. An example of a cost function is the mean squared error between the prediction and the ground truth, for data where such ground truth labels are available. During the learning process, the neural network 190 can use back-propagation algorithms to employ different optimization methods to learn model parameters (e.g., the weights for the interconnections between nodes in the hidden layers 192) that minimize the cost function. An example of such an optimization method is stochastic gradient descent.

In an example, the training dataset for the neural network 190 can be from a same data domain. For instance, the neural network 190 is trained for learning the predicted or expected responses, actions, behaviors, wants and/or needs of the user for a given set of inputs or input data. In this illustration, the data domain includes session data collected for interactions of the user with baseline input data. In another example, the training dataset is from different data domains to include input data other than baseline.

As such, the neural network 190 may identify expected responses, actions, behaviors, wants and/or needs of the user for a given set of inputs. Based on these predictive results, the neural network 190 may also define an AI model 120 that is used to provide contextually aware (e.g., of the environment and user) services for the corresponding user.

Figure 2:
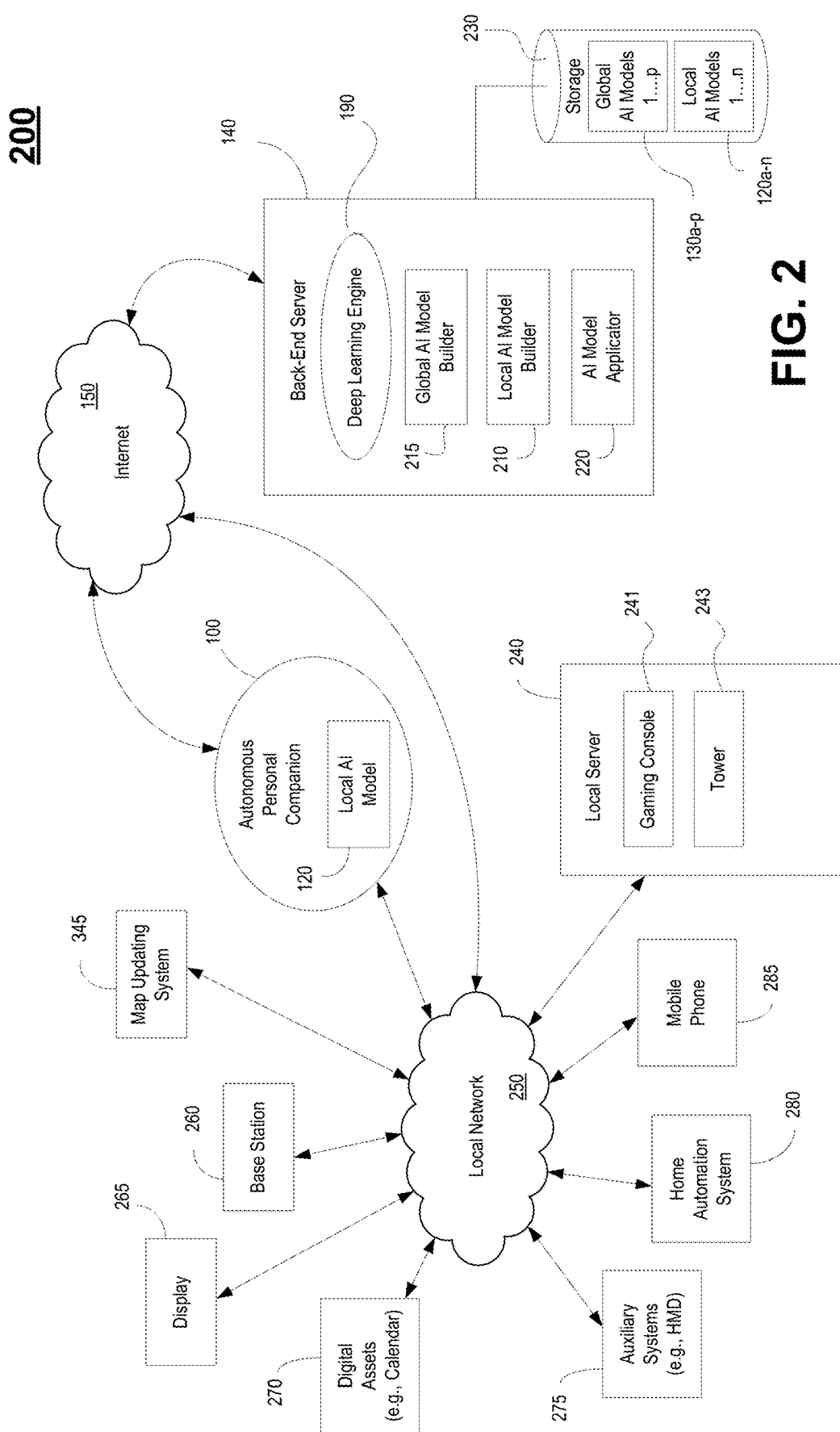
FIG. 2 illustrates a system supporting an autonomous personal companion implemented through an AI model of a user, in accordance with one embodiment of the present disclosure.

FIG. 2 illustrates a system 200 supporting an autonomous personal companion 100 implemented through a local AI model 120 of a corresponding user, in accordance with one embodiment of the present disclosure. The personal companion 100 is configured to provide services to the user based on the local AI model 120 which is capable of predicting among others the responses, actions, behaviors, wants and/or needs of the user through identification of patterns of user behavior that when classified into tags may be used to select a scenario, and provide an AI response considering the scenario that predicts the wants and/or needs of the user and provides services responsive to those wants and/or needs.

As previously described, the personal companion 100 may work independently of or in conjunction with a back-end server 140 that performs modeling of the local AI model 120, and application of the local AI model. In particular, the back-end server 140 includes the deep learning engine 190, previously described, that is configured for learning and/or modeling, in part, the responses, actions, behaviors, wants and/or needs of the user for any given set of inputs (e.g., that define a given scenario driven by or experienced by the user) in order to build and apply a local AI model 120 that supports and provide services to the corresponding user. In particular, the local AI model builder 210 is configured to interface with the deep learning engine to build the one or more local AI models 120a-n that are stored in storage 230. In addition, the global AI model builder 215 is configured to interface with the deep learning engine to build the one or more global AI models 130a-p, previously described, and also stored in storage 230. For example, the AI model builders 210 and 215 may operate to set the parameters defined within the deep learning engine 190 that define the various nodes in the input layer 191, hidden layers 192, and output layer 193, for purposes applying the corresponding AI models within the deep learning engine 190.

The autonomous personal companion 100 may implement the local AI model 120 both within its form factor (e.g., autonomous robot shell) and through the back-end server 140, or a combination thereof. As previously described, companion 100 may implement the local AI model 120 independent of the back-end server, such as when performing less complex AI operations (e.g., a request to turn on the room lights), or when there is limited or no network connectivity. In addition, the companion 100 may implement the local AI model 120 in cooperation with the back-end server. For example, the companion 100 may perform preliminary operations through the local AI model 120 that is localized in order to structure or condition the input parameters (e.g., defining the operations to be performed) so that they are easily delivered (e.g., reduced and/or compressed) to the back-end server 140, wherein most of the artificial intelligence within the AI model 120 is performed by the AI model applicator 220 and/or the deep learning engine 190.

As shown in HU. 2, the autonomous personal companion 100 is located within the same environment of the user, so that it may provide services to the user. The companion 100 is able to interface with one or more digital or physical objects and/or entities either directly through wired or wireless connections (not shown) or through the local network 250, wherein the network 250 may include wired or wireless connections. FIG. 2 shows the interfacing of companion 100 with various digital and/or physical objects. Additional interfacing with other digital and/or physical objects are contemplated. As shown, companion 100 may interface with the objects in the local environment directly (e.g., wired or wireless peer-to-peer communication) or through a local network 250 (e.g., BLUETOOTH®, WI-FI®, local area network, etc.) via wired or wireless connections. In addition, local network 250 is communicatively coupled with the wide area network or internet 150 to facilitate communication of the various digital and physical objects communicating through local network 250 to other remote objects (e.g., back-end server 140, other servers, etc.).

For example, the companion 100 may interface with base station 260, such as moving one or both of the base station 260 and the companion 100 to the same or approximately the same location for purposes of recharging the companion 100, or communicating with the base station to receive software updates, as well as other exemplary use cases.

In addition, the companion 100 may interface with a local server 240, wherein the server 240 may include a gaming console 241, tower computer 243, etc. For example, the gaming console 241 may provide a main stream of data to display 265, and may also provide summaries or the complete version of the main stream to the companion 100, so that companion 100 may access helpful information (e.g., gaming assistance) that can be displayed (e.g., through a display of companion 100) or delivered (e.g., audio) to the user simultaneous with the game play of the user. The tower 243 may provide additional features that the companion 100 may control or take advantage of, such as search operations, file storage, etc.

In one embodiment, companion 100 may interface and/or implement a map updating system 345, which may be located within or remote from companion 100. The map updating system 345 is configured to continually map the environment within which the companion 100 is located. For example, the updating may occur as a background process to other applications executing on companion 100. In that manner, as objects move around the environment or are newly introduced into the environment, the map updating system 345 is able to recognize that movement and/or introduction to continually update the mapping of objects and structures within the environment. As such, based in part on the updated mapping, the companion 100 is able to move about the environment without colliding with objects. Movement by companion 100 may be necessary to place the companion in the best position to provide services. For example, companion 100 may need to move closer to a wall that is used to project images, or may need to move closer to the user to better listen to the user for purposes of holding a conversation or responding to requests, etc.

As a further example, companion 100 may interface with one or more digital assets 270, for purposes of controlling operations within those assets or accessing data within those digital assets. For example, a digital asset may include a calendaring feature that is implemented within a processor or operating system, such as through local server 240, in which case, the companion 100 may be tasked to update or create an entry, or obtain imminent calendar dates, etc. on the calendaring feature.

In still another example, the companion 100 may interface with one or more auxiliary systems 275. For example, an auxiliary system 275 may include a head mounted display (HMD), such that the personal companion may receive updates from the virtual reality (VR) content being displayed through the HMD in order to provide additional content to be displayed within the HMD that is consistent with the VR content (e.g., providing information augmenting the VR—implementing augmented reality).

Also, the companion 100 can interface with a home automation system 280 that is configured to automate the functioning of the home (e.g., setting thermostats for heating and cooling, ventilation controls, window coverings, network connectivity, digital content delivery and presentation, home appliances including washers and dryers, etc.). As such, companion 100 may instruct the home automation system 280 to turn off lights in the entertainment room in order to provide the best lighting for a display concurrent with the game play of the user.

In addition, companion 100 may interface with mobile phone 285 to access and/or control various features provided by phone 285. For example, companion 100 may connect with the streaming music feature on phone 285 to broadcast music.

Figure 3A:
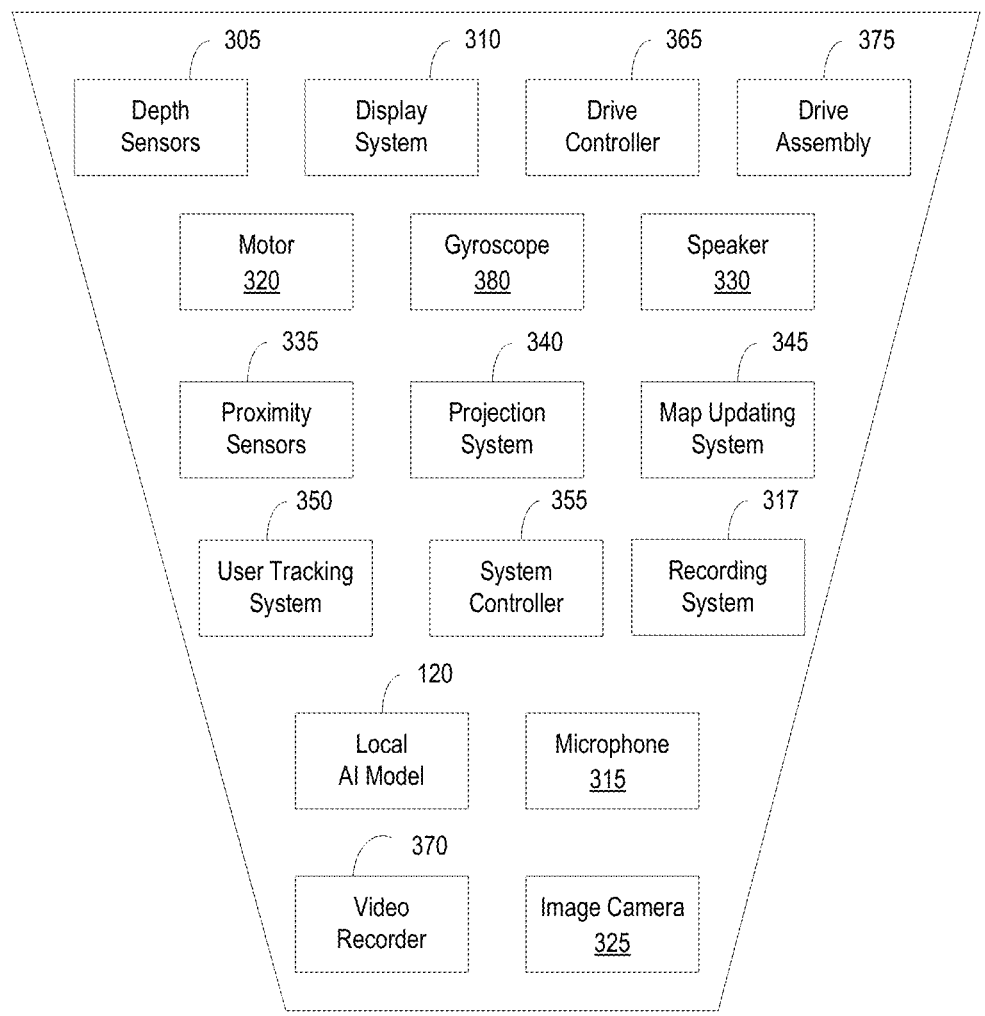
FIG. 3A is a block diagram of an autonomous personal companion that is implemented through an AI model of a user, in accordance with one embodiment of the present disclosure.

FIG. 3A is a block diagram of an autonomous personal companion 100 that is implemented through a local AI model of a user, in accordance with one embodiment of the present disclosure. As previously introduced, the companion 100 is configured to interface with a corresponding user to provide services of any type (e.g., digital, physical, etc.) through a local AI model 120. The local AI model 120 may be a distributed model that cooperates with a back-end server 140 to predict, in part, the behaviors, responses, actions, reactions, wants and/or needs of the user. Though various exemplary components of the companion 100 are shown in FIG. 3A, other functions and/or components are well supported.

As shown in FIG. 3A, companion 100 includes a system controller 355 configured to manage the overall operations. For example, controller 355 may manage the hardware and software resources available for use by the various components in order to facilitate operation of the companion 100. In addition, controller 355 may control one or more of the components (e.g., motor 320, depth sensor 305, etc.) provided within companion 100, including the interfacing and cooperation between the components.

Drive controller 365 is configured to manage the mobility functions implemented by the companion 100. The ability for motion is provided, in part by the motor assembly 320 (e.g., electric, fuel, etc.), or other means for propulsion, and the drive assembly 375 configured to impart motion to the companion 100. In some implementations, drive assembly 375 may include one or more wheels, or other means (e.g., hover capability) configured to provide movement of companion 100. In some cases, gyroscope 380 may provide stability information to the drive controller 365 in order to keep the companion 100 in the correct orientation, while in a stationary position, or while moving.

Companion 100 may include components configured for aiding navigation of the companion through a current environment. For example, depth sensors 305 and proximity sensors 335 may provide information regarding fixed and moving objects in the environment. In particular, proximity sensors 335 may be configured to determine the location of objects (e.g., by detecting surfaces) in close proximity to companion 100. Depth sensors 305 may also be configured to determine the locations of near and far objects within the environment of companion 100. That is, the sensors 305 and 335 are able to determine the depth of objects in relation to a placement of the companion 100 within the environment, and through continual updating generate a mapping of the environment that includes locations of objects (new and updated) within the environment. In addition, depth sensors 305 may be configured to determine the composition of the objects, such as determining whether an object is hard (e.g., metal desk) or soft (e.g., couch). Depth and proximity sensors may employ one of various techniques for determining the location and/or composition of objects within the environment, including the use of electromagnetic fields, induction, radio frequencies, thermal variations, infrared frequencies, air flow, etc. Further, images may be captured by camera 325 and/or video recorder 370 in order to provide object information (e.g., relational positioning of objects), as well as providing other uses and services (e.g., personal image and video capture, video gaming recording, recording of daily activities of user, etc.).

In addition, map updating system 345 may use, in part, the information provided by the depth sensors 305 and proximity sensors 335 in order to map the environment. Other information and/or data may be accessed for purposes of mapping to include architectural blueprints, images captured by camera 325, video recorder 370, etc. Mapping system 345 may be configured to provide a three dimensional (3D) view of the environment. For example, the data collected by the various components and/or third party information can be used to generate one or more types of mapping of the environment. These mapping include two-dimensional and 3D maps. Further, map updating system 345 continually maps the environment using one or more tools (e.g., depth sensors 305 and proximity sensor 335, etc.), as previously described. For example, objects that move around or are introduced into the environment are discoverable, such that locations of the objects are updated into the mapping of the environment. Other types of mappings include images and video tours of the environment. In one embodiment, the information may be used to map out the home of the user, wherein room locations can be determined, walls of the rooms can be classified (e.g., for purposes of determining which can be used as projection screens), actual and virtual images of the various rooms may be stored and provided, and video and virtual tours of the home may be generated (e.g., for purposes of insurance, real estate showings, etc.).

In another embodiment, companion 100 may include a display system 310 for purposes of entertainment, communication, etc. For example, display system 310 may be used for communicating with the user, such as when providing results of an internet search by the user, or querying the user for one or more purposes (e.g., inquiring about the general well-being of user, clarifying various requests by the user, etc.). In addition, display system 310 may be used as a primary gaming display (showing the game play of the user playing a gaming application as streamed by a primary gaming stream from a gaming console), or auxiliary display for providing secondary gaming stream (e.g., information related to the game play of the user). Display system 310 may be configured to show a movie or other digital content. Display system 310 may work in conjunction with speaker or audio system 330 for providing audio in relation to the images or video provided by the display. For example, audio of the game play of the user may be presented in association with and synchronized with the video of the game play as presented on display.

In another embodiment, companion 100 may include a display system 310 for purposes of entertainment, communication, etc. For example, display system 310 may be used for communicating with the user, such as when providing results of an internet search by the user, or querying the user for one or more purposes (e.g., inquiring about the general well-being of user, clarifying various requests by the user, etc.). In addition, display system 310 may be used as a primary gaming display (showing the game play of the user playing a gaming application as streamed by a primary gaming stream from a gaming console), or auxiliary display for providing a secondary gaming stream (e.g., information related to the game play of the user). Display system 310 may be configured to show a movie or other digital content. Display system 310 may work in conjunction with speaker or audio system 330 for providing audio in relation to the images or video provided by the display. For example, audio of the game play of the user may be presented in association with and synchronized with the video of the game play as presented on display.

Recording system 317 is configured to capture video and/or audio of digital information collected and/or generated by companion 100. For example, the game play (e.g., video and audio) of the user playing a gaming application may be collected and stored. Additional information may be collected by recording system 317, such as additional audio from the user as the user is playing the gaming application, and joined with the video and audio of the game play.

In addition, a user tracking system 350 may be configured to track general and specific movement of the user. General movement includes overall body movement of the user within the environment. Specific movement may be targeted to a part of the body, such as determining the movement of the head, or torso of the user. For example, tracking system may determine orientation of the various body parts of the user, and track the turning of the head or body. Tracking system 350 may collect data provided by one or more other components, including images and video from camera 325 or video recorder 370, depth sensors 305, proximity sensors 335, or other tracking sensors (e.g., integrated or third party sensors—such as provided through a gaming console), etc.

Figure 3B:
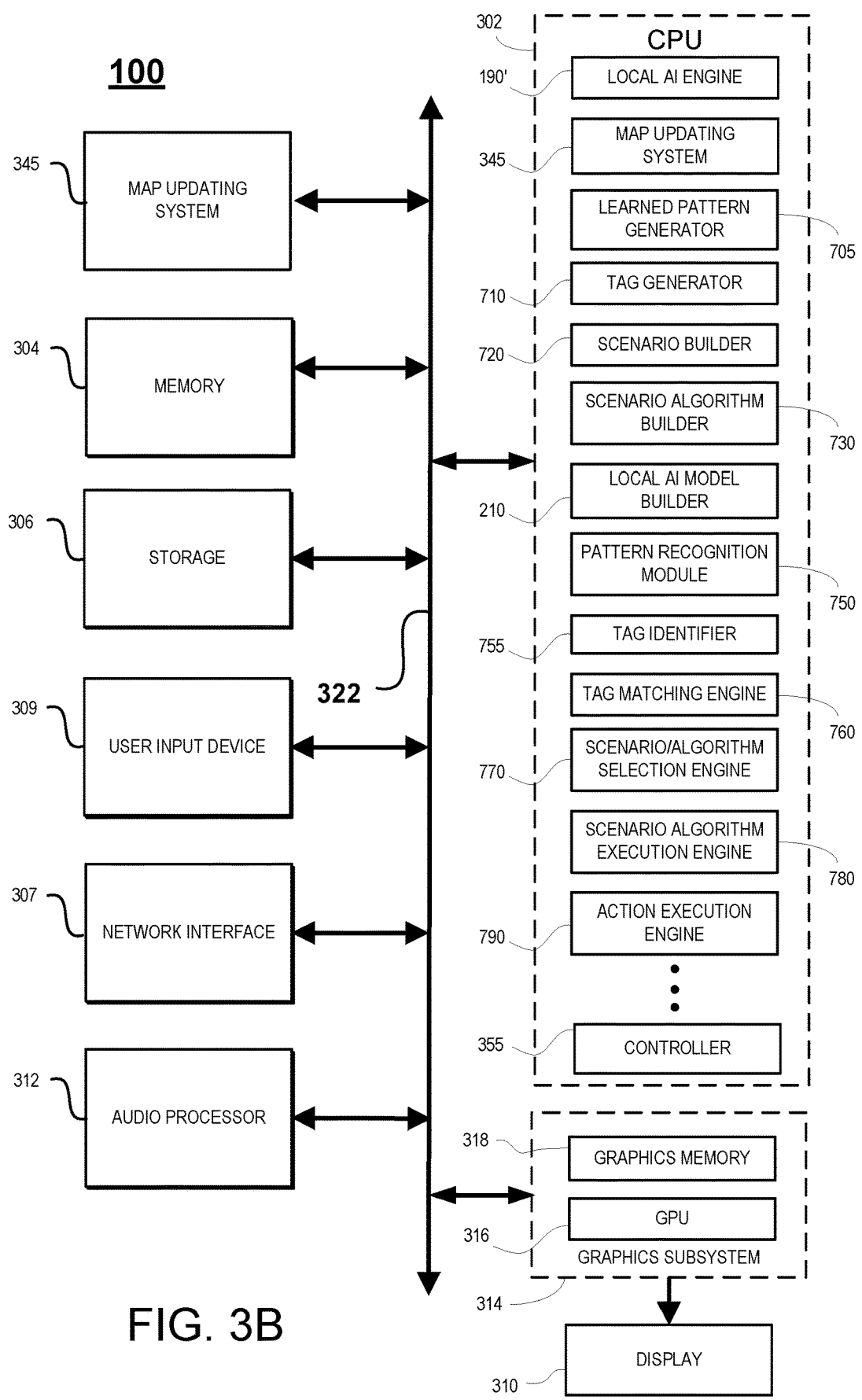
FIG. 3B illustrates components of an example device 100 that can be used to perform aspects of the various embodiments of the present disclosure.

FIG. 3B illustrates components of an example device 100 that can be used to perform aspects of the various embodiments of the present disclosure. For example, FIG. 3B illustrates an exemplary hardware system suitable for implementing a device that provides services in support of a user, wherein the device is configured to provide services as implemented through a local AI model that is capable of predicting, in part, the behaviors, actions, reactions, responses, wants and/or needs of a corresponding user, in accordance with one embodiment. This block diagram illustrates a device 100 that can incorporate or can be a personal computer, video game console, personal digital assistant, or other digital device, suitable for practicing an embodiment of the disclosure. Device 100 includes a central processing unit (CPU) 302 for running software applications and optionally an operating system. CPU 302 may comprise one or more homogeneous or heterogeneous processing cores.

In accordance with various embodiments, CPU 302 is one or more general-purpose microprocessors having one or more processing cores. Further embodiments can be implemented using one or more CPUs with microprocessor architectures specifically adapted for highly parallel and computationally intensive applications, such as media and interactive entertainment applications, of applications configured for deep learning, content classification, and user classifications. For example, CPU 302 may be configured to include the localized AI engine (e.g., deep learning) engine 110 that is configured to support and/or perform learning operations with regards to predicting, in part, user behavior, actions, responses, reactions, wants and/or needs of the user and provide services based on that prediction. Also, AI engine 110 is configured to apply the local AI model 120 of the user at the companion 100. In addition, CPU 302 may provide additional functionality as provided by one or more of components of companion 100 as shown in FIG. 3A, such as the controller 355, drive controller 365, map updating system 345, etc.

CPU 302 may also provide additional functionality related to the contextualization of captured information related to a user (e.g., audio and visual data of the user and/or the environment within which the user is located), by classifying the captured data into tags, which can be matched to previously defined or learned patterns, the combination associated with a matched scenario, wherein execution of an algorithm associated with the matched scenario given certain input data (e.g., the captured information) generates a result, which when performed responds to the captured input data by generating an outward behavior of the AI, as implemented through the autonomous personal companion 100. For example, CPU 302 includes a learned pattern generator 705 for learning patterns of user behavior, tag generator 710 for classifying the learned patterns of user behavior into tags, scenario builder 720 for building scenarios associated with collections of learned patterns and corresponding tags—the scenarios contextualizing the user behavior, scenario algorithm builder 730 for generating an algorithm based on a corresponding contextual scenario to generate an appropriate AI response given input data (e.g., user behavior), and local AI model builder 210 for building the local AI model, all of which are configured to apply deep learning to learn patterns related to one or more users and/or the environment within which the users are located, classify the learned patterns through tagging, build scenarios associated with combination of the learned patterns and associated tags, and build scenario algorithms which when executed respond to the captured data of a specific user and/or the environment in which the user is located. A more detailed description of these components is provided in FIG. 7A. In particular, based on captured data of the user and/or the environment of the user, pattern recognition module 750, tag identifier 755, tag matching engine 760, scenario and scenario algorithm selection engine 770, scenario algorithm execution engine 780, and action execution engine 790 are configured to identify patterns of user behavior in the captured data with corresponding predefined tags that can be grouped into a collected set of tags, compare the collected tags to sets of predefined tags associated with scenarios, assign a weight to the sets of predefined tags defining a corresponding match quality between the collected set of tags and a corresponding set of predefined tags, sort the sets of predefined tags and corresponding weights in descending order, and select a matched scenario that is associated with a matched set of tags having a weight of highest match quality. A more detailed description of these components is provided in FIG. 7B.

As shown, the map updating system 345 may be implemented through a hardware based device located within the companion 100. In particular, the map updating system 345 is configured to generate a mapping of the environment within which the companion 100 is located. This mapping may include a localized positioning system, such as a newly generated and/or formatted coordinate system defining the positions within space of the environment. For example, the coordinate system may incorporate values of a global positioning system (GPS), or a 3D Cartesian coordinate system, a mix of systems (e.g., floor plan defining rooms of a building interfaced with individual coordinate systems for each room), or any suitable positioning system.

Memory 304 stores applications and data for use by the CPU 302. Storage 306 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 308 communicate user inputs from one or more users to device 100, examples of which may include keyboards, mice, joysticks, touch pads, touch screens, still or video recorders/cameras, and/or microphones. Network interface 307 allows device 100 to communicate with other computer systems via an electronic communications network, and may include wired or wireless communication over local area networks and wide area networks such as the internet. An audio processor 312 is adapted to generate analog or digital audio output from instructions and/or data provided by the CPU 302, memory 304, and/or storage 306. The components of device 100, including CPU 302, memory 304, data storage 306, user input devices 308, network interface 310, and audio processor 312 are connected via one or more data buses 322.

A graphics subsystem 314 is further connected with data bus 322 and the components of the device 100. The graphics subsystem 314 includes a graphics processing unit (GPU) 316 and graphics memory 318. Graphics memory 318 includes a display memory (e.g., a frame buffer) used for storing pixel data for each pixel of an output image. Graphics memory 318 can be integrated in the same device as GPU 316, connected as a separate device with GPU 316, and/or implemented within memory 304. Pixel data can be provided to graphics memory 318 directly from the CPU 302. Alternatively, CPU 302 provides the GPU 316 with data and/or instructions defining the desired output images, from which the GPU 316 generates the pixel data of one or more output images. The data and/or instructions defining the desired output images can be stored in memory 304 and/or graphics memory 318. In an embodiment, the GPU 316 includes 3D rendering capabilities for generating pixel data for output images from instructions and data defining the geometry, lighting, shading, texturing, motion, and/or camera parameters for a scene. The GPU 316 can further include one or more programmable execution units capable of executing shader programs. In one embodiment, GPU 316 may be implemented within AI engine 190' to provide additional processing power, such as for the AI or deep learning functionality.

The graphics subsystem 314 periodically outputs pixel data for an image from graphics memory 318 to be displayed on display device 310, or to be projected by projection system 340. Display device 310 can be any device capable of displaying visual information in response to a signal from the device 100, including CRT, LCD, plasma, and OLED displays. Device 100 can provide the display device 310 with an analog or digital signal, for example.

It should be understood that the embodiments described herein may be executed on any type of client device. In some embodiments, the client device is a head mounted display (HMD), or projection system.

Figure 4A:
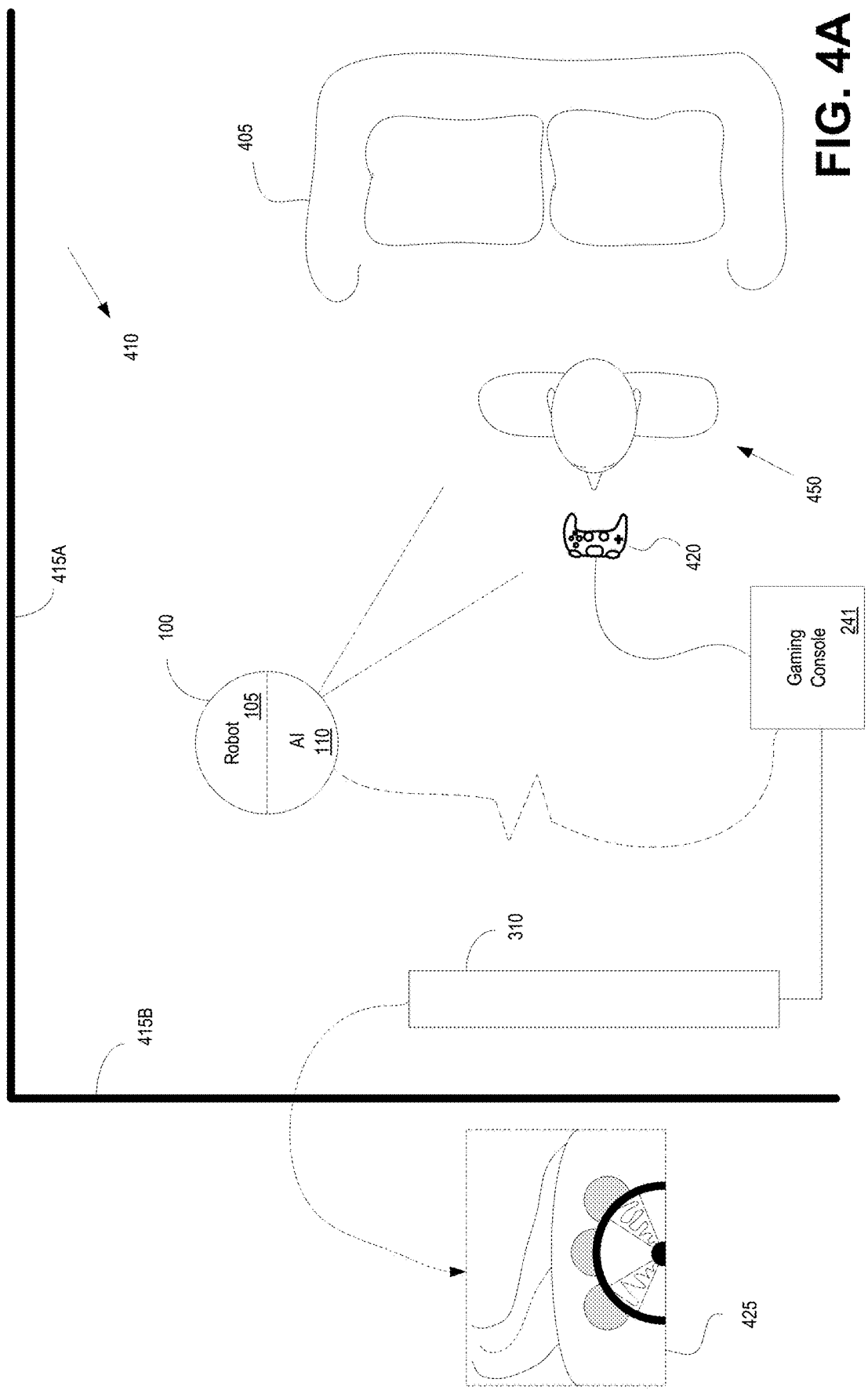
FIG. 4A illustrates an autonomous personal companion supporting the game play of a user playing a gaming application, in accordance with one embodiment of the present disclosure.
Figure 4B:
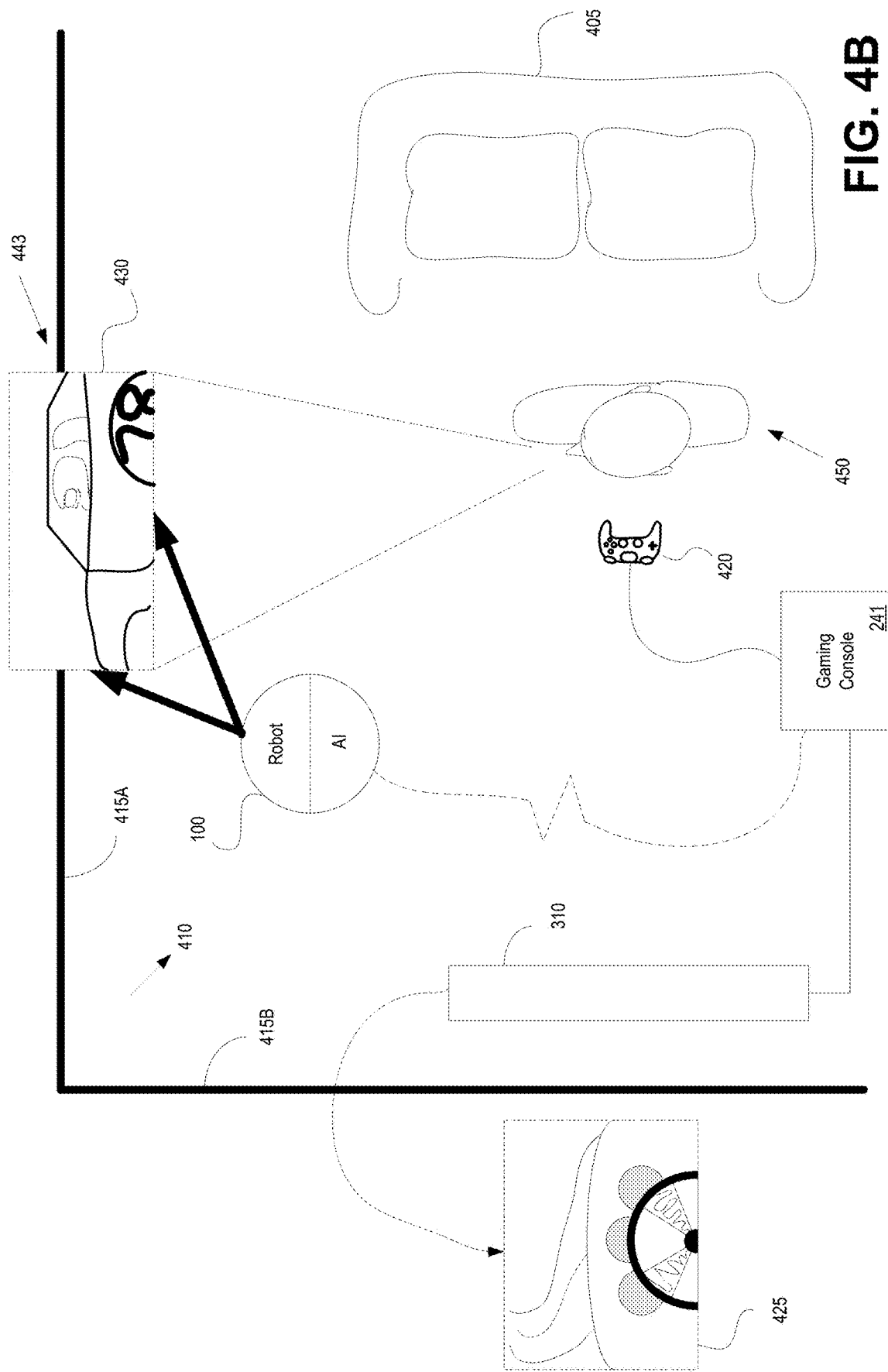
FIG. 4B illustrates the integration of a three-dimensional (3D) gaming world of the gaming application, played by the user introduced in FIG. 4A, and the physical environment of the user, wherein the autonomous personal companion is configured to project a portion of the 3D gaming world into the physical environment in response to a direction of the gaze of the user, in accordance with one embodiment of the present disclosure.
Figure 4C:
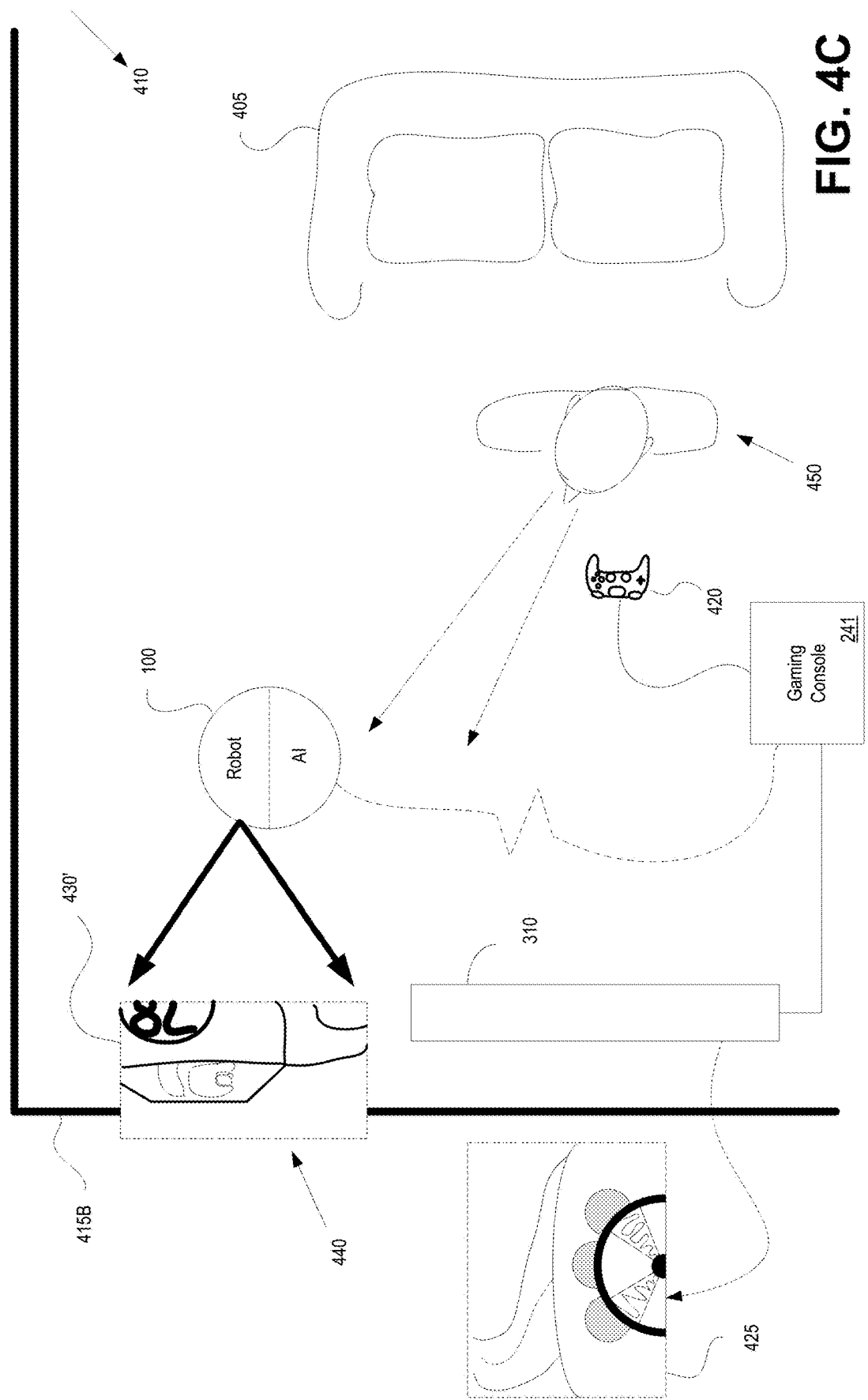
FIG. 4C illustrates another example of the integration of the 3D gaming world of the gaming application introduced in FIGS. 4A-4B, wherein an extension of the 3D gaming world of the gaming application is projected alongside a display, wherein the display shows the main view of the gaming application, wherein the extension shows a portion of the 3D gaming world, or provides supplemental information to the gaming application, in accordance with one embodiment of the present disclosure.

FIGS. 4A-4C illustrate exemplary implementations of an autonomous personal companion 100 within a home environment of a corresponding user, in accordance with one embodiment of the present disclosure. As previously described, companion 100 is configured to provide services to the user through a local AI model 120, wherein the AI model 120 may work independent of any back-end server, or may work in a distributed fashion with an AI model 120 located at a back-end server to predict, in part, the behaviors, responses, actions, reactions, wants and/or needs of the user. Though companion 100 is configured to provide a variety of services under various scenarios, FIGS. 4A-4C show a scenario where a user 450 is playing a gaming application that is executing on a gaming console 241 (or executed at a back-end server and streamed through the gaming console), and where companion 100 is capable of providing supplementary information to the game play of the user 450.

As shown, the user is located in a home environment 410, such as an entertainment room. The room includes two walls 415A and 415B. The environment 410 includes a couch 405. The user has access to a gaming console 241. In particular, the gaming application is executing and/or streaming through gaming console 241 (or any other device) in association with game play of the user 450, wherein the game play is responsive to user input, such as through controller 420. A primary stream of the game play is created, wherein video of the game play is delivered to display 310. In addition, audio of the game play may be provided through an audio system (not shown). The gaming application may be an open road racing game, wherein the user is playing a driver of a car in the race. Screen shot 425 shows an image of the video stream delivered to the display 310, and includes a view out of the front windshield and over the dash of the race car that shows the oncoming road, as well as the steering wheel and various instruments in the dash.

In addition, companion 100 is located in the environment 410, and includes a robot form factor 105 and AI 110 that is configured to implement a local AI model 120 of user 450. For example, AI 110 may be AI engine 190' that cooperates with AI engine 190 at back-end server 140. The local AI model 120 as implemented through AI 110 is configured to provide, in part, services to user 450 related to the game play. As such, companion 100 may be communicatively coupled to gaming console 241 at least to receive information about the gaming application and/or game play. For example, the information may include the title and version of the game and the game state of the game play. In addition, companion 100 may include information provided in a secondary stream of the gaming application. For instance, gaming console 241 may generate a primary stream for presentation on display 310 and a secondary stream that is presented (e.g., via display, projection, speaker, etc.) through companion 100.

In one embodiment, companion 100 is configured to provide supplemental support for the game play of a user, wherein the information may be related to game plays of the user and other players playing the gaming application. The information may provide general information related to the gaming application, in some implementations. The supplemental information may provide assistance to the user 450 in advancing the game play. For example, the assistance may be in the form of coaching to help the user 450 achieve a goal (e.g., pass a level), and may include visual cues showing controller inputs that generally or directly help the user achieve the goal within the gaming application. A detailed description of the supplemental information as provided through a companion application is provided in co-pending patent application entitled "GAME PLAY COMPANION APPLICATION," U.S. patent application Ser. No. 15/476,597, filed on Mar. 31, 2017, herein incorporated by reference in its entirety.

FIG. 4B illustrates the autonomous personal companion 100 interfacing with the gaming console 241 to provide supplemental information related to the game play of user 450, as introduced in FIG. 4A. For instance, FIG. 4B shows user 450 within environment 410 playing a gaming application executed on or streamed through gaming console 241. In particular, FIG. 4B illustrates the integration of a three-dimensional (3D) gaming world of the gaming application, and the physical environment of the user. As shown, companion 100 is configured to project a portion of the 3D gaming world of the gaming application into the physical environment 410. For instance, companion 100 is able to extend the view of the 3D world beyond what is presented on display 310, which continues to show screen shot 425. In particular, companion 100 projects a video stream (including screen shot 430) as a secondary stream of the gaming application, simultaneous with the primary video stream presented on display 310 (and including screen shot 425).

In addition, the projection provided by companion 100 may be made in response to a direction of the gaze of the user 450, in accordance with one embodiment of the present disclosure. For instance, a gaze tracking system of companion 100 or working in conjunction with companion 100 is configured to capture the direction of the gaze of user 450 during the game play. As an illustration, as the user is racing, a sound may be directionally provided within environment 410, which may trigger head movement. As shown, the head of user 450 is turned dramatically to the right. Other triggers are supported, such as an arrow pointing to the right side, as displayed within the primary stream on display 310. For example, a sound locator and projection system in companion 100 may produce a sound that originates, or is made to originate, from a location in environment 410 that also corresponds to a point of origin within the gaming world of the gaming application. The sound may be from the engine of a competitor that is trying to pass the driver controlled by user 450, and may originate to the right of the driver, or more specifically from the right side of the cockpit. As the head of the user turns to the right to gain a better view of the passing racer, a projection of that portion of the gaming world as viewed from the standpoint of the user 450 is presented on wall 415A in area 443, wherein the projection is presented in approximately the proper location of the objects in the gaming world and in relation to a location of the character played by the user, wherein the character location is associated with a physical location of the user 450. As shown, a screen shot 430 of the projection of the secondary information includes Race Car No. 78 passing on the right side.

In one embodiment, area 443 may have been discovered during a mapping process of environment 410 previously accomplished. The mapping process discovered that area 443 may be suitable for displaying supplemental information and/or content. Companion 100 may position itself with respect to wall 415A and/or user 450 in environment 410 to properly present the supplemental information.

FIG. 4C illustrates another example of the integration of the 3D gaming world of the gaming application introduced in FIGS. 4A-4B, wherein an extension of the 3D gaming world of the gaming application is projected alongside display 310 showing the primary stream of the game play of user 450, in accordance with one embodiment of the present disclosure. As shown, instead of projecting the secondary or supplemental information on wall 415A, the information is projected on wall 415B, just to the right of display 310. For example, during the mapping process of environment 410, it may be determined that wall 415A cannot support projection of images. That is, even if companion 100 projected onto wall 415A, the video stream would not be viewable (e.g., wall 415A contains a bookcase). As such, companion 100 may project the supplemental information on wall 415B in an area 440 that still somewhat conveys the proper sense of location of the objects in the projection in the gaming world, especially in relation to the display 310 showing the primary video of the gaming application. In another implementation, the projection is an extension of the video stream presented on display 310. As such, companion 100 projects the supplemental video stream onto area 440, to include the screenshot 430', which is analogous to screenshot 430 of FIG. 4B, that includes the Race Car No. 78 in a passing position. Screenshot 430' is projected to the right side of the cockpit, as represented by the point-of-view (e.g., screenshot 425) of the character driver presented on display 310.

In one embodiment, the projection onto wall 415B may be triggered by the gaze of user 450 off-center from display 310. As shown, the head of user 450 is not turned approximately 90 degrees, as it would be in the gaming environment, but more like 45 degrees to view area 440 of wall 415B. In other embodiments, the projection may be autonomously produced by companion 100 during the execution of the gaming application. For example, the supplemental information may be automatically projected by companion 100 to provide an enhanced user experience. In that case, other supplemental information may be provided at other locations within environment 410 at other times.

Figure 5:
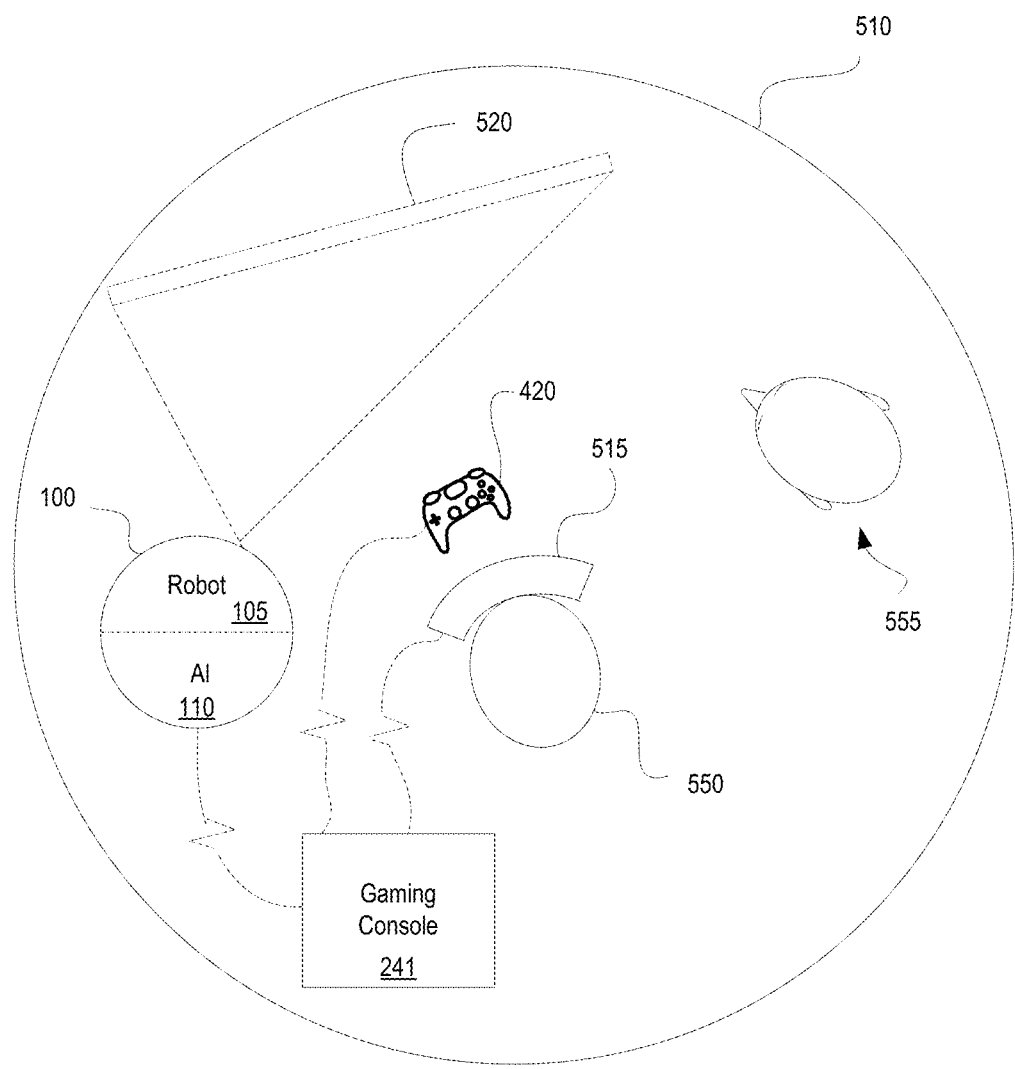
FIG. 5 illustrates the integration of a 3D virtual reality (VR) world of a gaming application played by a first user using a head mounted display (HMD) and the physical environment, wherein an autonomous personal companion is configured to project a portion of the VR gaming world into the physical environment in response to a direction of the gaze of the user to allow a spectator to have a parallel participation in the experience of VR gaming world of the first user, in accordance with one embodiment of the present disclosure.

FIG. 5 illustrates the integration of a 3D virtual reality (VR) world of a gaming application played by a user 550 using a head mounted display (HMD) 515 and the physical environment 510, in accordance with one embodiment of the present disclosure. As shown in FIG. 5, user 550 is playing a gaming application that is executing on gaming console 241 (or executed at a back-end server and streamed through the gaming console, or through any other device) in association with game play of user 550, wherein the game play is responsive to user input, such as through controller 420 and/or movement of the HMD 515.

As previously described, companion 100 is configured to provide services to the user through a local AI model 120, wherein the AI model 120 may work independent of any back-end server, or may work in a distributed fashion with an AI model 120 located at a back-end server to predict, in part, the behaviors, responses, actions, reactions, wants and/or needs of the user. Companion 100 includes a robot form factor 105, and artificial intelligence for implementing the AI model 120 corresponding to the user 550.

More particularly, companion 100 is configured to project a portion of a virtual reality (VR) gaming world of the gaming application into the physical environment 510. For example, the projection 520 of the VR gaming world may be made onto a wall (not shown) in the environment 510. The projection 520 may also be made through a physical display that is controlled by companion 100. In this manner, the view as experienced by the user 550 may also be presented to the spectator 555. In one embodiment, the projection is made in response to a direction of the gaze of the user 550 to allow spectator 555 to have a parallel participation in the experience of VR gaming world of user 550, in accordance with one embodiment of the present disclosure. As such, if the environment 510 is suitable for projection, as the user 550 changes orientation when viewing the VR gaming world, companion 100 may also change the projection 520 to a different location within environment 510 to closely correspond to the proper location in the VR gaming world. That is, if the head of user 550 turns 90 degrees counter-clockwise, the projection 520 may be made on a wall that is to the left of user 550, and also to the left of spectator 555. In that manner, spectator may gain a sense of the VR gaming world as projected by companion application into the physical environment 510.

FIGS. 6A-6E illustrate various exemplary forms of autonomous personal companions, wherein the companions may be implemented through companion 100 as shown in FIGS. 1-5, in accordance with embodiments of the present disclosure. The companions shown in FIGS. 6A-6H are configured to provide services to a corresponding user through a local AI model 120, wherein the AI model 120 may work independent of any back-end server, or may work in a distributed fashion with an AI model 120 located at a back-end server to predict, in part, the behaviors, responses, actions, reactions, wants and/or needs of the user.

Figure 6A:
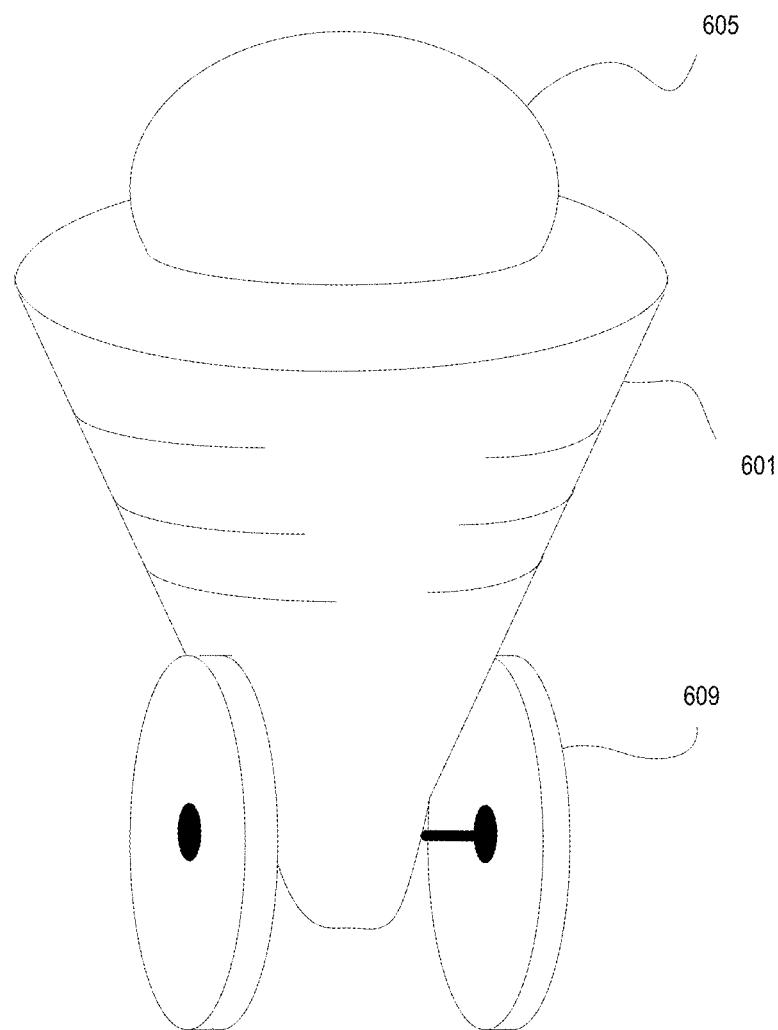
FIG. 6A illustrates an exemplary form of an autonomous personal companion for a user that is implemented through an AI model of the user, in accordance with one embodiment of the present disclosure.

In particular, FIG. 6A illustrates an exemplary form of companion 600A for a user that is implemented through an AI model of the user, in accordance with one embodiment of the present disclosure. Though FIG. 6A shows a generic form factor, companion 600A may be implemented within any suitable form factor. For example, body 601 is shown having a conical shape with the lower portion of smaller diameter than an upper portion. An upper housing 605 may protrude from body 601 to facilitate additional features of companion 600A.

In particular, companion 600A includes one or more wheels 609 in the lower portion, or any suitable means for providing mobility in two or three dimensions for companion 600A. In that manner, companion 600A may move around within environment as necessary to provide its services. For example, companion 600A may independently move around an environment to capture the best images of the environment, or to select the best location for projecting video and/or images. In addition, body 601 may rotate in one location to provide the best orientation for companion 600A within the environment.

Figure 6B:
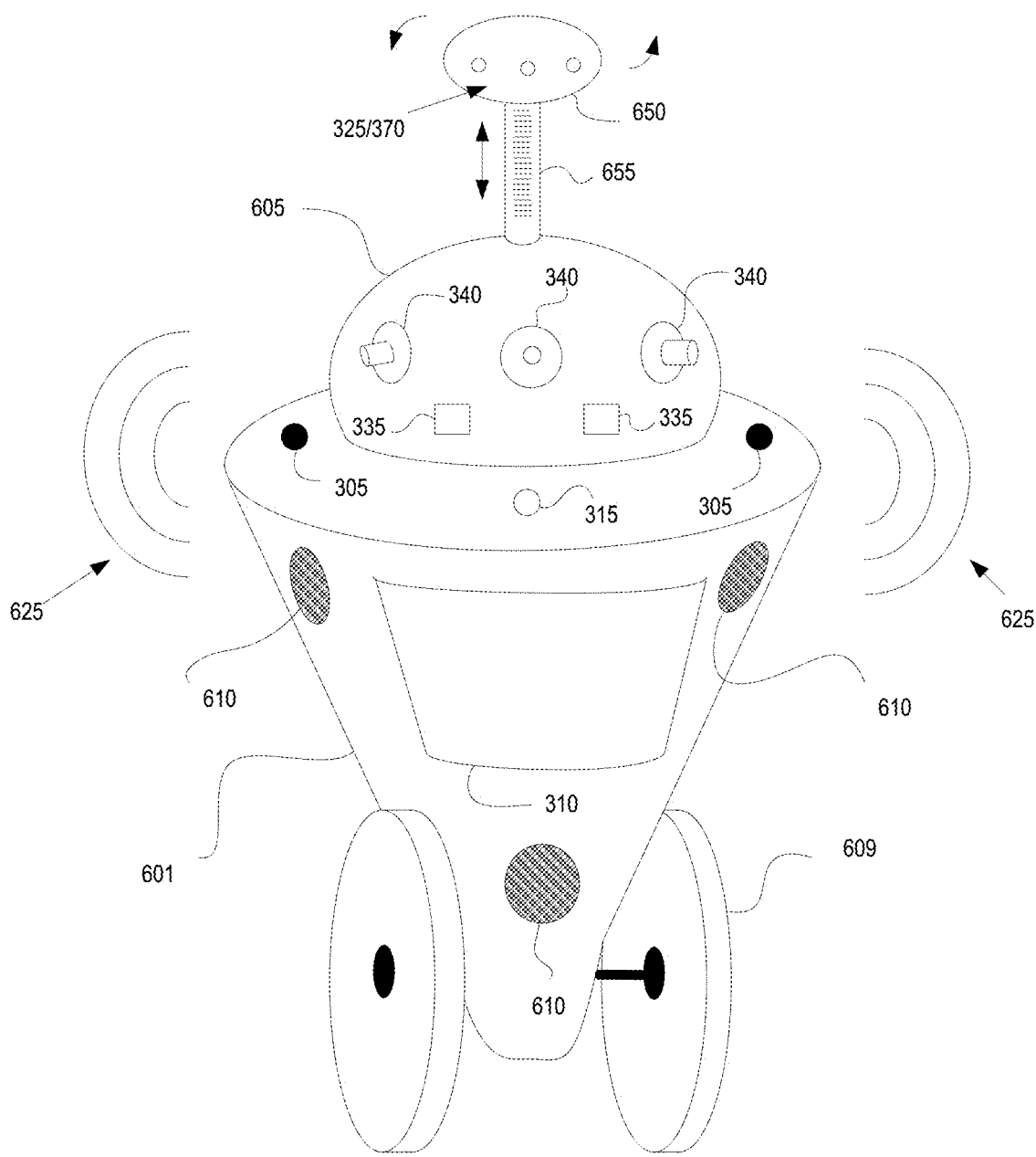
FIG. 6B illustrates an exemplary autonomous personal companion configured with an array of capabilities to include, in part, the projection of images, the sensing of the proximate environment, and the providing of auxiliary sound, in accordance with embodiments of the present disclosure.

FIG. 6B illustrates an exemplary autonomous personal companion 600B configured with an array of capabilities to include, in part, the projection of images, the sensing of the proximate environment, and the providing of auxiliary sound, in accordance with embodiments of the present disclosure. In particular, companion 600B is shown having the generic form factor with body 601, and first introduced in FIG. 6A. In addition, wheels 609 are shown to represent the ability for motion through an environment.

Companion 600B includes speakers 610 arranged throughout body 601. In addition, speakers 610 may be located in other portions of companion 600B, such as in upper housing 605. Display 310 is located on the surface of body 601, and is configured to present information and/or data when performing services for the corresponding user. For example, display 310 may display text when querying the user for a response, or present video or text in response to a query from the user. Display 310 may also present other supplementary information, such as that generated in association with the game play of a user playing a gaming application.

Companion 600B includes one or more sensors used to sense the environment, wherein the sensors may be located at various locations on the companion surface. For example, depth sensors 305 may be located on the surface of the upper portion of body 601, wherein the depth sensors are configured to determine locations of near and far objects within the environment. One or more depth sensors 305 may also be used to determine the composition of the objects, or the surface hardness of the objects. In addition, one or more proximity sensors 335 may be located in the surface of the upper housing 605, wherein the proximity sensors may be configured to determine the location of objects near to the companion 600B. As previously described, depth and proximity sensors may employ various techniques (e.g., electromagnetic fields, induction, radio frequencies, thermal variations, infrared frequencies, air flow, etc.), as shown by signals 625, to determine locations of objects.

In addition, the upper portion of body 601 includes one or more microphones 315, configured for capturing audio recordings of the environment. For example, audio of the corresponding user may be recorded to capture the live reactions of the user, which may be replayed at a later time. Also, recorded audio may be synchronized with recorded video captured by video recorder 370 located in capsule 650. Also, image camera 325 may be located in capsule 650. The combination of image camera 325 and video recorder 370 allows companion 600B to capture video and/or images of the user and/or environment.

As shown, capsule 650 has various degrees of motion and orientation. Capsule 650 is attached to lift mechanism 655, and can move up and down in relation to body 601 of companion 600B. For example, capsule 650 may raise itself to gain a better view of the environment, such as when camera 325 or recorder 370 are blocked by an object (e.g., wall, couch, furniture, book case, etc.). In addition, capsule 650 may rotate about the shaft of the lift mechanism 655, such that the rotation may occur in relation to a static body 601.

Upper housing of companion 600B may include one or more projection systems 340. As previously described, projection systems 340 may project supplementary information onto a surface of the environment (e.g., wall of a room). The surface may be determined through a mapping of the environment, as previously described. The supplementary information may be used for communicating with the user when the companion 600B is providing services to the user.

Figure 6C:
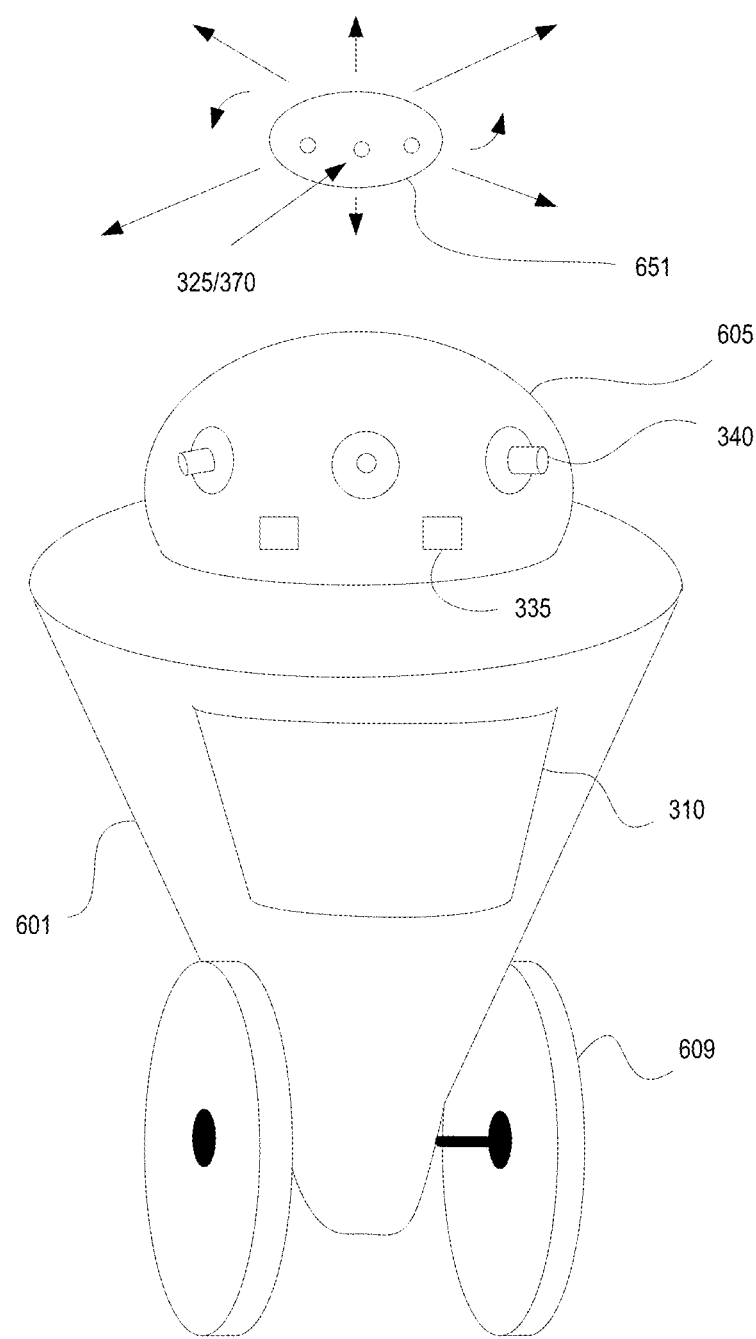
FIG. 6C illustrates an exemplary autonomous personal companion including a drone assembly that is configured with one or more features, for example image capturing and image projection, in accordance with one embodiment of the present disclosure.

FIG. 6C illustrates an exemplary autonomous personal companion 600C including a drone assembly 651 that is configured with one or more features, for example image capturing and image projection, in accordance with one embodiment of the present disclosure. As shown, companion 600C has one or more features previously introduced, to include a body 601 generically represented, means for movement (e.g., wheels 609 as shown), a display 310, proximity sensors 335, and projectors of a projection system 340. Other features previously introduced are not shown for purposes of clarity.

In particular, companion 600C includes drone assembly 651 that is coupled to upper housing 605 (or any other suitable surface area capable of receiving assembly 651) when in a resting position. For instance, drone assembly 651 may interface with upper housing 605 for purposes of charging a battery. Other resting locations are contemplated that are remote from companion 600C, such as a separate base station. Further, drone assembly 651 is communicatively coupled to one or more components of the companion 600B, such as controller 355. Image camera 325 and/or video recorder 370 may be located on drone assembly 651 for purposes of capturing images and video. Other components may also be located on assembly 651, such as a projector of the projection system 340.

As shown, drone assembly 651 is able to move about within the environment. Any suitable means for providing movement are contemplated, such as propeller systems, air flow systems, light air systems, tethering systems, etc. As such, drone assembly 651 is able to move in three dimensions throughout the environment, and rotate itself within the environment. Movement may be necessary in order to place the camera 325 and/or video recorder 370 in a better position for capturing images and/or video. For example, the view of a room in a certain direction as taken from a point corresponding to body 601 and upper housing 605 of companion 100 may be blocked by an object. The drone assembly 651 may be deployed to a location that is not obstructed by the object (e.g., straight up) in order to capture the view.

Figure 6D:
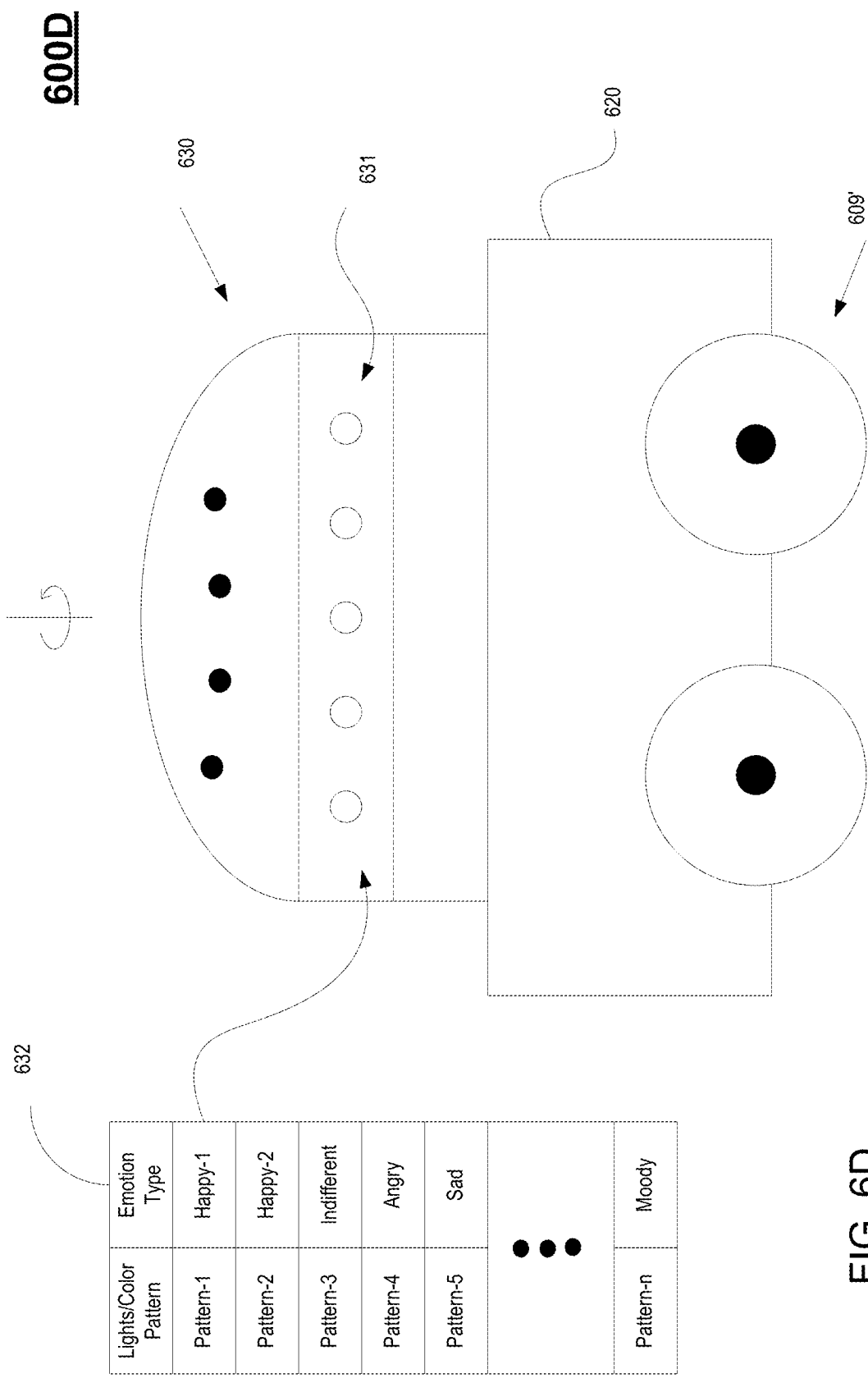
FIG. 6D illustrates an exemplary autonomous personal companion including a rotating top portion configured with one or more features, for example image capturing and image projection, in accordance with one embodiment of the present disclosure.

FIG. 6D illustrates an exemplary autonomous personal companion 600D including a rotating top portion 630 configured with one or more features, in accordance with one embodiment of the present disclosure. Companion 600D is shown to illustrate different form factors suitable for implementing the local AI model 120 of a corresponding user. As shown, companion 600D includes a base 620. Mobility means are provided within base 620, such as wheels 609', or any other suitable means for motion previously described.

In particular, companion 600D includes a top portion 630, which may include cameras 325, video recorders 370, depth sensors 305, proximity sensors 335, etc. For illustration, top portion 630 may be rotatable about the base 620. In that manner, companion 600D may orient itself to best provide services to a user (e.g., place itself in a good position for communicating with user). That is, combining the mobile features of companion 600D and the rotating top portion 630, a variety of orientations are possible for the companion within its environment. For example, top portion 630 may be rotated towards an object in the environment to give a camera system a good view of the object. Further, companion 600D may move closer to the object to give the camera system a better view of the object.

In some implementations, rotation of the top portion 630 is able to convey emotion or display some behavior of the companion 600D. In that case, top portion 630 may be outfitted with multi-colored lighting that is programmed to show emotion. For example, a band of lights 631 is shown on top portion 630. Each of the lights in band 631 may be turned on or off according to a corresponding pattern. In addition, each of the lights in band 631 may show a sequence of colors according to corresponding pattern. Table 632 shows a list of light patterns (e.g., on/off, color sequence, etc.), wherein each pattern may be associated with a corresponding emotion of the companion 100. For example, pattern-1 may be associated with a first happiness emotion, and pattern-2 may be associated with a second type of happiness. Other emotions may be exhibited through other patterns, such as showing indifference, angriness, sadness, moodiness, etc.

Figure 6E:
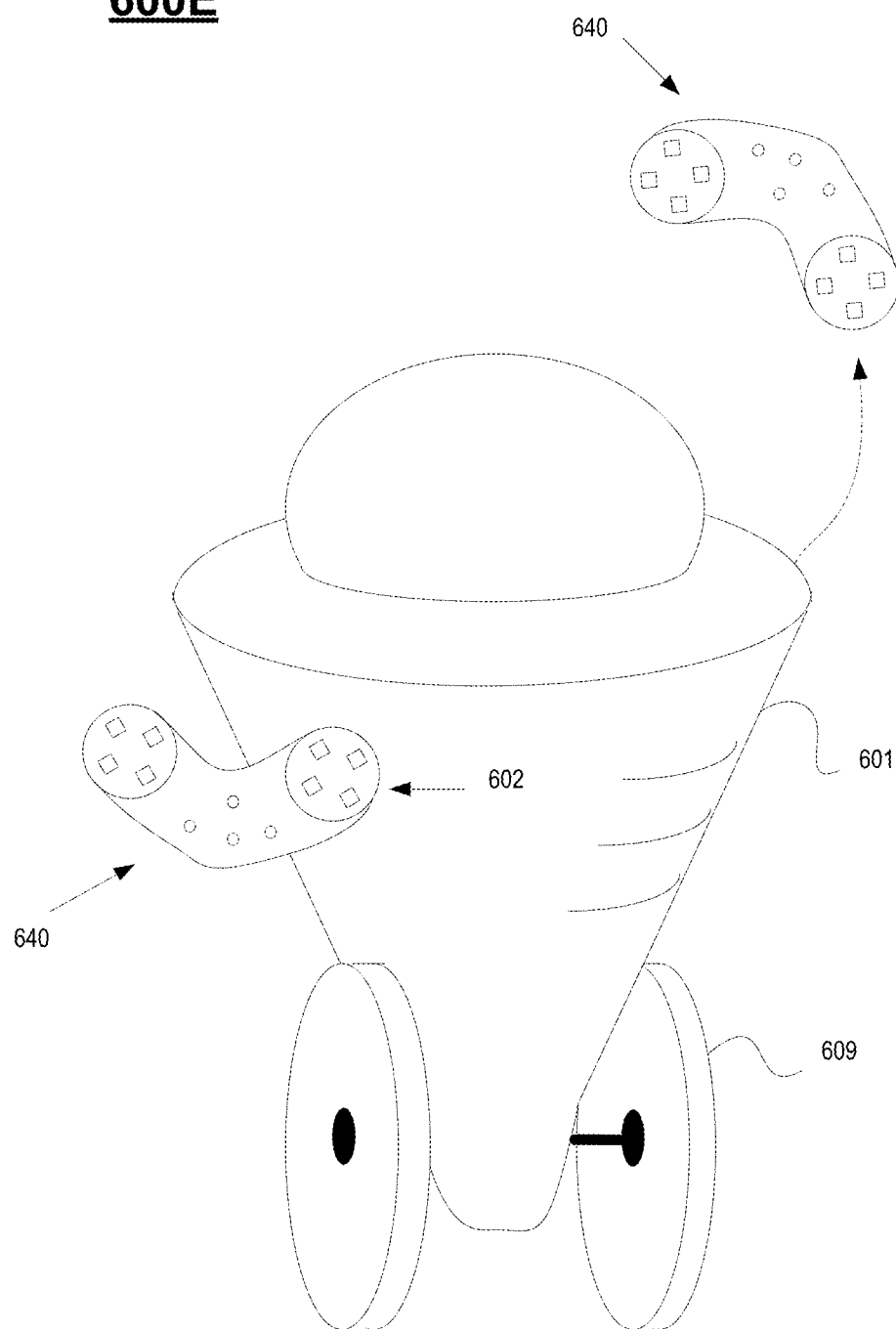
FIG. 6E illustrates an exemplary autonomous personal companion including one or more appendages, wherein the appendages may take the form of controllers, wherein the appendages/controllers may be removable from the companion, in accordance with one embodiment of the present disclosure.

FIG. 6E illustrates an exemplary autonomous personal companion 600E including one or more appendages 640, in accordance with one embodiment of the present disclosure. As shown, companion 600E has one or more features previously introduced, to include a body 601 generically represented, and means for movement (e.g., wheels 609 as shown). Other features previously introduced are not shown for purposes of clarity.

In particular, appendages 640 may provide controller functionality. For example, appendage 640 may include controller 420, and may interface with gaming console 241 for purposes of providing control instructions during the execution of a gaming application on gaming console or at a back-end server. In one embodiment, one or more of appendages 640 may be removed for easier manipulation and handling. In that manner, the user may interface with appendage 640 in the normal manner of handling a gaming controller.

In one embodiment, each appendage 640 is configured with a recharging port that is capable of coupling to a base charging port. An internal battery (not shown) is located within the corresponding appendage 640. The base charging port may be located on body 601, such as within connections associated with pivot point 602. In that manner, as the appendage 640 is replaced back onto the body 601, charging of the internal battery may occur. That is, power (e.g., electric charge) is transferred through the body 601 of companion 600E to the internal batter of appendage 640, in one embodiment. In another embodiment, power is transferred in the opposite direction, such that power is transferred from the internal battery to the companion 600E. In that manner, appendage 640 may be configured as the primary recharging medium for supplying power to companion 600E, and may be removed to be electrically and/or communicatively coupled to a base charging station separate from body 601. While appendage 640 is decoupled (e.g., recharging), companion 600E may continue to operate using an internal battery source, wherein the battery source can be recharged once appendage 640 is again coupled to body 601.

In one embodiment, appendages 640 act as arms for companion 600E. For example, appendage 640 may move about a pivot point 602 on body 601. Movement of appendage 640 may provide some communication. For instance, a pattern of movement of appendage 640 may signal a greeting by companion 600E. In another instance, appendages 640 may be extended outwards from body 601 to show a welcoming stance of companion 600E. In still another instance, an appendage 640 may be extended to provide a hand shake or first bump with a user. Other motions are contemplated. In addition, the appendages may be of any form or configuration, in other embodiments. For instance, the head or upper housing 605 configured as an appendage of the companion 600E may be detachable from the body 601.

Embodiments of the present disclosure support various alternative form factors for the autonomous personal companion, in accordance with embodiments of the present disclosure. Further embodiments provide for communication between two autonomous personal companions 100 either directly, or through a network. As an illustration, each of the companions may be performing operations related to mapping of a room in a building that requires moving around the room, wherein during their movements one or both companions may sense another companion in proximity. The companions may further move themselves into positons for purposes of communicating with each other. In one implementation, each of the companions may be associated with a corresponding QR code. The QR code codes may be used to exchange identification information. For example, a QR code provides access to information (e.g., via a back-end server) about a corresponding companion. As such, the companions may move themselves to locations where the QR code codes may be passed (e.g., bringing a display showing a QR code of a first companion within viewing range of a camera system of a second companion). Once captured, the QR code then may be delivered to a server over a network to access identification information about the companion associated with the captured QR code. In that manner, identifying information may be exchanged between companions.

Scenarios Selection Based on Identified Tags Describing Captured User Data and Execution of Related Scenario Algorithms in Response to the Captured Data Accordingly, the various embodiments of the present disclosure describe systems and methods for an autonomous personal companion implemented as AI, wherein the AI makes use of a model (e.g., local AI model) trained via a deep learning engine on information that has been identified as contextually relevant to a user with the goal of providing personalized assistance to the user. In one embodiment, the trained model acts as a behavior selection strategy for the AI as implemented through the personal companion. The local AI model is implemented through an autonomous personal companion that is mobile and configured to move autonomously to position itself to best receive data, collect data, sense the environment, and deliver data. The autonomous personal companion is configurable to provide contextually relevant and personalized assistance to the user. The personal companion was previously introduced in FIGS. 1-6. Personalization of the local AI model is achieved by filtering subjective and/or objective input data used within a deep learning engine 190 to generate the model. If filtering is not performed, then the AI models (local and global) all would be built using the same dataset, and as such would all be the same thus having the same personality (e.g., would achieve the same results for a given input set). In that manner, local AI models are generated with varying personalities, such that each AI model can be unique and reflect or be associated with the personalities of the corresponding user. In addition, embodiments of the present disclosure disclose the contextualization of captured information related to a user (e.g., audio and visual data of a user and/or the environment within which the user is located), wherein the captured information is classified into a set of tags, wherein the tags are matched to previously defined learned patterns of user behavior, the combination or collection of tags associated with a scenario providing contextualization of user behavior (e.g., prediction of the behavior, actions, response, wants and/or needs of a user). That is, a matching scenario can be determined based on the combination of matched tags, wherein the matching scenario has a corresponding algorithm. Execution of the matched algorithm given the captured data as input generates a result, which when performed responds to the captured user data. Specifically, the result may be an outward behavior of the AI, such that the AI provides a response that provides services based on the matched scenario.

Figure 7A:
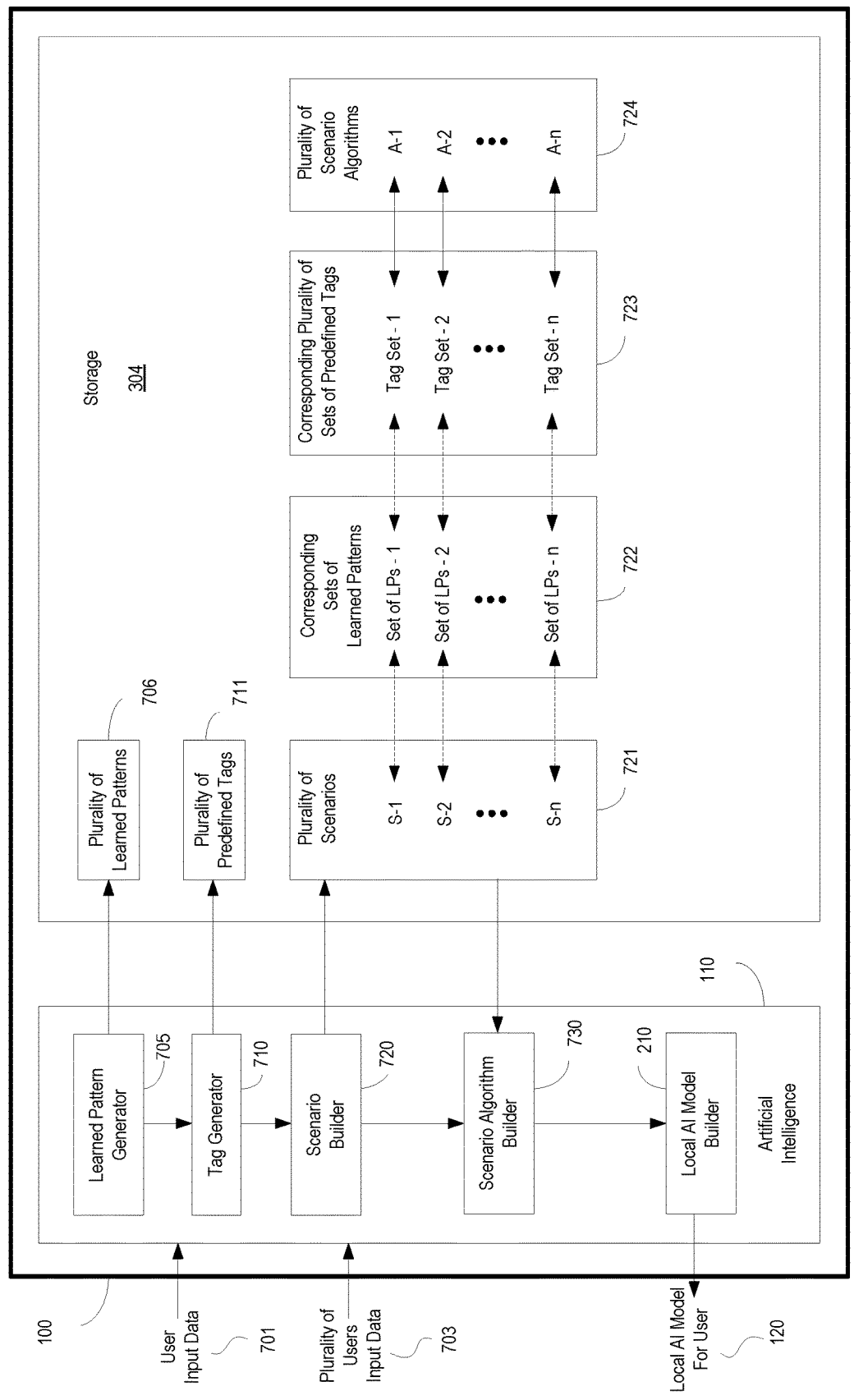
FIG. 7A is a block diagram of an autonomous personal companion configured to perform AI to build a plurality of scenarios based on a plurality of learned patterns determined from monitored behavior of users, wherein the scenarios have matching algorithms that when performed produce a result based on captured data, in accordance with one embodiment of the present disclosure.

FIG. 7A is a block diagram 700A of an autonomous personal companion 100 configured to perform AI to build a plurality of scenarios based on a plurality of learned patterns of user behavior determined from monitored behavior of users, wherein the scenarios have matching algorithms that when performed produce a result (e.g., outward behavior of AI as implemented through a personal companion) based on captured data (e.g., current user data), in accordance with one embodiment of the present disclosure. In one embodiment, the functions and features described in FIG. 7A are implemented entirely within personal companion 100. In another embodiment, the functions and features described in FIG. 7A may be implemented at the personal companion, the back-end server 140 of FIGS. 1A and 2, or a combination of the two. In particular, the components of FIG. 7A disclose the application of deep learning or AI to capture/monitor data 701 of a user and capture/monitor data 703 of a plurality of users in order to build learned patterns of behavior of a specific user or a generic user (to include the user environment), building of scenarios experienced by the user and/or users, and the building of a local AI model of the specific user that responds to captured user data that relate to a matched scenario.

User input data 701 and input data 703 from a plurality of users may be provided to an AI engine to, in part, build a local AI model 120 of a specific user. Although FIG. 7A shows that the AI engine 110 is local to the autonomous personal companion 100, it is understood that various configurations may be employed to provide localized functionality or distributed functionality of the components shown in FIG. 7A. In particular, the input data 701 and 703 are received by the learned pattern generator 705, which is configured to generate learned patterns relating to the behavior of the user (e.g., biometrics, actions, emotions, expectations, desires, likes, wants, needs, etc.) as well as patterns relating to the environment of the user. The plurality of learned patterns 706 may be placed into storage (such as local memory 304 and/or storage at the back-end server 140).

Each of the learned patterns 706 may be associated with one or more tags. In particular, tag generator 710 is configured to analyze the learned patterns of user behavior and generate tags describing the learned patterns. For example, one or more tags may be used to describe a corresponding learned pattern. The tag may be used for classifying the learned pattern, and may be used for searching or matching in embodiments of the present disclosure. A plurality of predefined tags 711 generated by the tag generator 710 may be placed into storage (such as local memory 304 and/or storage at the back-end server 140).

In addition, the scenario builder 720 is configured to define scenarios related to the contextual environment of a specific user and/or a generic user related to a group of users. In particular, one or more learned patterns may be grouped together, such that the combination is used to describe a particular contextual environment, which is defined as a scenario. As such, the scenario provides contextualization of user behavior (e.g., prediction of the behavior, actions, response, wants and/or needs of a user). For example, the scenario may describe a context for a corresponding user or generic user to include a Friday night sit down session with one or more friends to watch digital content (e.g., television shows, movies, short clips, etc.). That is, the learned patterns and/or their corresponding tags may be used to describe the scenario. As such, each scenario is based on and related to a corresponding set of learned patterns of user behavior, wherein the set of learned patterns is based on and related to a set of predefined tags.

In addition, the scenario algorithm builder 730 is configured to generate a corresponding algorithm for each scenario. Once the contextual environment of the user or generic user is defined through a scenario, an algorithm can be built that instructs what actions are appropriate for a corresponding autonomous personal companion 100 to perform given the contextual environment. In particular, the scenario algorithm builder analyzes the sets of learned patterns and sets of predefined tags that define the various scenarios, and for each scenario builds a corresponding algorithm. Each algorithm can be executed to generate a result, which when performed by a corresponding personal companion responds to captured user data related to a contextual environment of the user. That is, the algorithm when executed given certain input (e.g., captured user data) generates a result which may be an outward behavior of the AI, such that the AI provides a response that provides services based on the scenario providing contextualization.

As shown in FIG. 7A, the plurality of scenarios 721 are built based on and related to corresponding sets of learned patterns 722 of user behavior, and also based on and related to corresponding sets of predefined tags 723, wherein the plurality of scenarios 721 corresponds to a plurality of scenario algorithms 724. For example, scenario S-1 has a corresponding set of learned patterns (LPs-1), corresponding tag set-1, and scenario algorithm A-1; scenario S-2 has a corresponding set of learned patterns (LPs-2), corresponding tag set-2, and scenario algorithm A-2; on up to the nth scenario S-n which has a corresponding set of learned patterns (LPs-n), corresponding tag set-n, and scenario algorithm A-n.

In one embodiment, a matching algorithm of a corresponding scenario may have a stickiness factor. For example, a scenario and matching algorithm may be given a priority related to the life of the scenario, when considering possible updates to the current scenario based on continual collection of user data. Some scenarios may have high priority (e.g., high stickiness factor), in that they may be repeatedly encountered by the user, such that a current scenario and its corresponding algorithm may have priority over a new scenario that may be a better representation of the current contextual environment of the user. Other scenarios may have low priority, in that they may be minimally encountered by the user (e.g., once or twice), wherein a scenario having low priority (e.g., low stickiness factor) may be replaced easily with a new scenario. As such, a stickiness factor for each of the plurality of algorithms of the plurality of scenarios may be defined.

The combination of the learned patterns, tags, scenarios, and scenario algorithms may define a local AI model 120 of the user. In particular, local AI model builder 210 may be configured to build the local AI model based on the various scenarios and related information (e.g., sets of learned patterns, corresponding sets of predefined tags, plurality of scenario algorithms, etc.). In that manner, an autonomous personal companion 100 may be configured to capture data related to the user and/or the environment of the user, and based on the local AI model 120 contextualize that captured data using identified tags that can be matched to a corresponding scenario and scenario algorithms, wherein the matched algorithm when executed generates a result (e.g., outward behavior of AI), which when performed by the personal companion provides a response to the captured user data, as will be further described in relation to FIG. 7B.

Figure 7B:
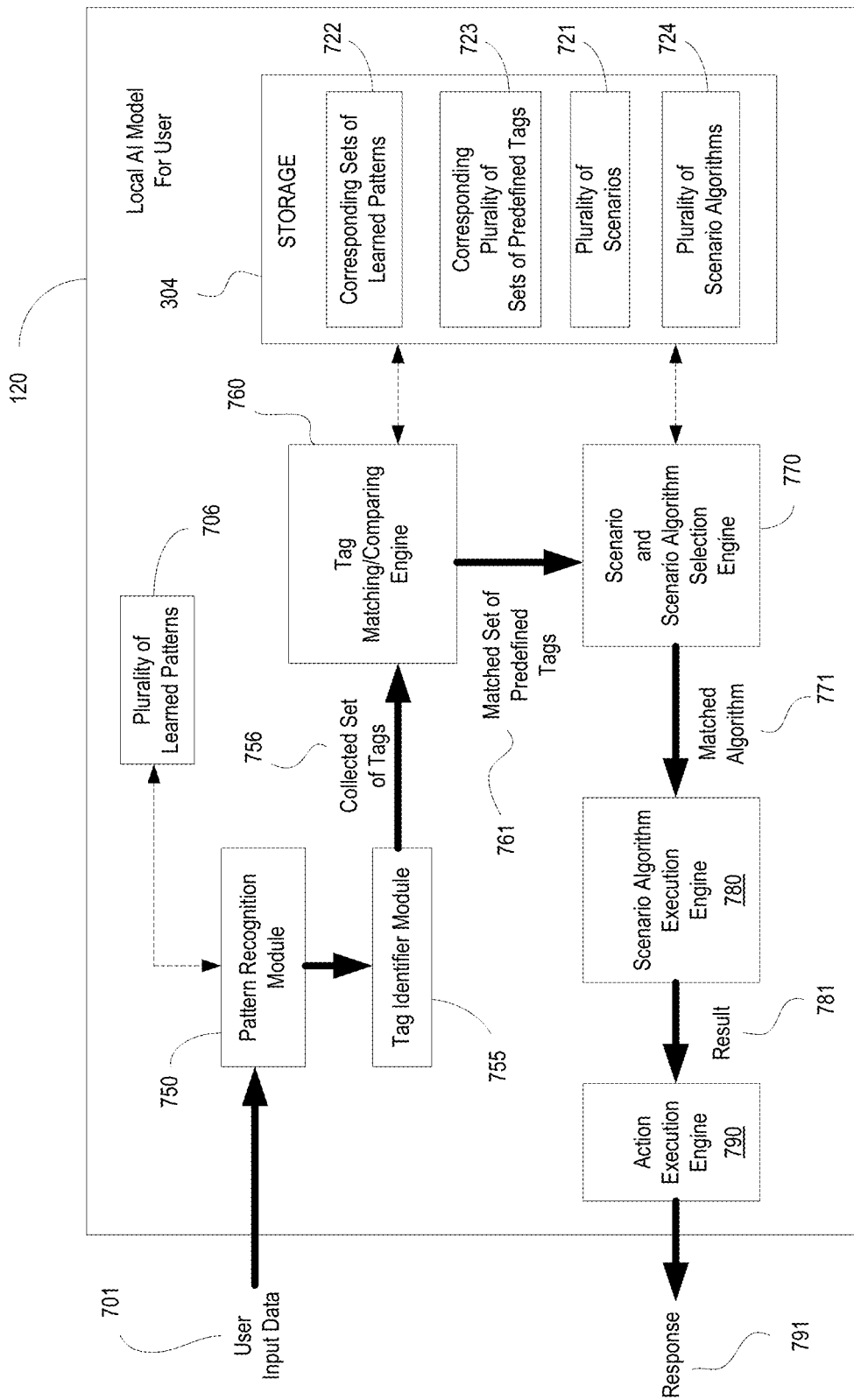
FIG. 7B is a block diagram of an autonomous personal companion configured to determine a contextual environment of a user based on identified learned patterns of observed user behavior, and determine a matching scenario and corresponding algorithm for the contextual environment in order to respond to the observed user behavior, in accordance with one embodiment of the present disclosure.

FIG. 7B is a block diagram 700B of an autonomous personal companion configured to determine a contextual environment of a user based on identified learned patterns of observed user behavior, and determine a matching scenario and corresponding algorithm for the contextual environment in order to respond to the observed user behavior, in accordance with one embodiment of the present disclosure. In one embodiment, the functions and features described in FIG. 7B are implemented entirely within personal companion 100. In another embodiment, the functions and features described in FIG. 7B may be implemented at the personal companion, the back-end server 140 of FIGS. 1A and 2, or a combination of the two. In particular, the components of FIG. 7B disclose the contextualization of a user or the environment of the user based on captured user data using a local AI model of the user, and the identification of learned patterns and related tags for the captured data, the matching of a scenario to the identified tags, and the execution of a corresponding scenario algorithm using the captured data to generate a result (e.g., outward behavior of AI), which when performed responds to the captured data. In that manner, the local AI model of a corresponding user is able to predict, in part, especially within a given environment or scenario experienced or driven by the user, the responses, actions, behaviors, wants and/or needs of the user for a given set of inputs (e.g., the captured data), and execute an algorithm based on the contextualization or prediction that generates an outward behavior of AI as a result, such that the AI provides a response that provides services to the user based on the contextualization of user behavior.

As shown, user input data 701 are input into an autonomous personal companion 100. For example, as the user is monitored, captured data are continually input into the personal companion which can be contextualized into one or more scenarios that are continually updated based on the change in the input data, as will be described below. In particular, the input data are received by the pattern recognition module 750 which is configured to analyze the input data and determine and/or identify patterns of learned user behavior within the input data. These patterns may be similar to previously defined learned patterns built through the deep learning engine 190, for example. For example, the characteristics of the input data may be similar to characteristics of previously defined learned patterns of a plurality of learned patterns 706, previously defined.

The identified patterns are delivered to the tag identifier module 755. The identified patterns are classified using tags. That is, the captured data are described using tags that relate to identified patterns in the data. As such, a collected set of tags 756 is generated that combined describe the captured data, and more particularly the user and/or the environment of the user (e.g., the contextual environment of the user).

The tag matching/comparing engine 760 is configured receive the collected set of tags 756 and compare the tags to predefined sets of predefined tags 723, which correspond to sets of learned patterns 722. Storage 304 may be configured to store the sets of learned patterns 722 and the sets of predefined tags 723. In particular, each set of predefined tags has a corresponding set of predefined or learned patterns. As such, tag comparing/matching engine 760 is configured to match the captured user data to an identified set of predefined or learned patterns, which corresponds to a matched set of predefined tags 761. A set of predefined tags and their corresponding learned patterns define a scenario, which may provide contextualization of user behavior (e.g., prediction of the behavior, actions, response, wants and or needs of a user). Specifically, the collected set of tags is compared to each of a plurality of sets of predefined tags that is associated with a plurality of scenarios. Each scenario corresponds to one or more predefined patterns of user behavior and a corresponding set of predefined tags, wherein the scenarios may be defined through deep learning, as previously described. In addition, a weight may be assigned to each of the sets of predefined tags when comparing the sets to the collected set of tags. Each weight defines a corresponding match quality between the collected set of tags and a corresponding set of predefined tags. The plurality of sets of predefined tags may be sorted based on the weights in descending order, for example. A matched scenario to the input data 701 and the collected set of tags may be selected, wherein the matched scenario is associated with a matched set of tags having a corresponding weight with the highest match quality. In one embodiment, a best fit algorithm is used to match the identified tags to the matched set of predefined tags. In other embodiments, any technique may be used for matching the tags.

The scenario and scenario algorithm selection engine 770 is configured to receive the matched set of predefined tags 761. Each set of learned patterns and corresponding set of predefined tags correspond to a scenario. As previously described, each scenario has a corresponding algorithm which when executed generates a result that when performed by a corresponding autonomous personal companion responds to the captured data. For example, the result may be an outward behavior of AI as implemented through a personal companion. That is, by identifying the scenario based on captured data, the contextual environment of the user may be determined, from which an appropriate response by the personal companion may be performed. In particular, the scenario/algorithm selection engine 770 is configured to match the identified set of learned patterns and matched set of predefined tags 761 to a matching scenario, wherein the matched scenario has a corresponding matched algorithm 771. As previously described, sets of learned patterns 722 correspond to sets of predefined tags, which correspond to a plurality of scenarios 721, which correspond to a plurality of scenario algorithms.

As shown in FIG. 7B, the matched algorithm 771 is executed by execution engine 780 to generate a result 781, which may classify a behavior of the user. The result may be a prediction, in part, of the responses, actions, behaviors, wants and/or needs of a specific user given a particular set of inputs 701 (e.g., that define a given scenario driven by or encountered by the user), and provide services through AI that is responsive to the prediction. The result is performed by the action execution engine 790 of the autonomous personal companion in order to provide a response 791 to the captured data 701 of the user. In one embodiment, the result includes one or more actions that are selected through execution of the matched algorithm, as will be described further in FIG. 7C. In that manner, the personal companion is configured to contextualize the captured user data (e.g., audio and visual data of the user and/or the environment within which the user is located), by classifying the captured data into tags which are associated with previously defined learned patterns of user behavior, the combination of tags being associated with a matched scenario, wherein execution of an algorithm associated with the matched scenario given certain input data (e.g., the captured information) generates a result (e.g., outward behavior of AI as implemented through a personal companion), which when performed responds to the captured input data.

Figure 7C:
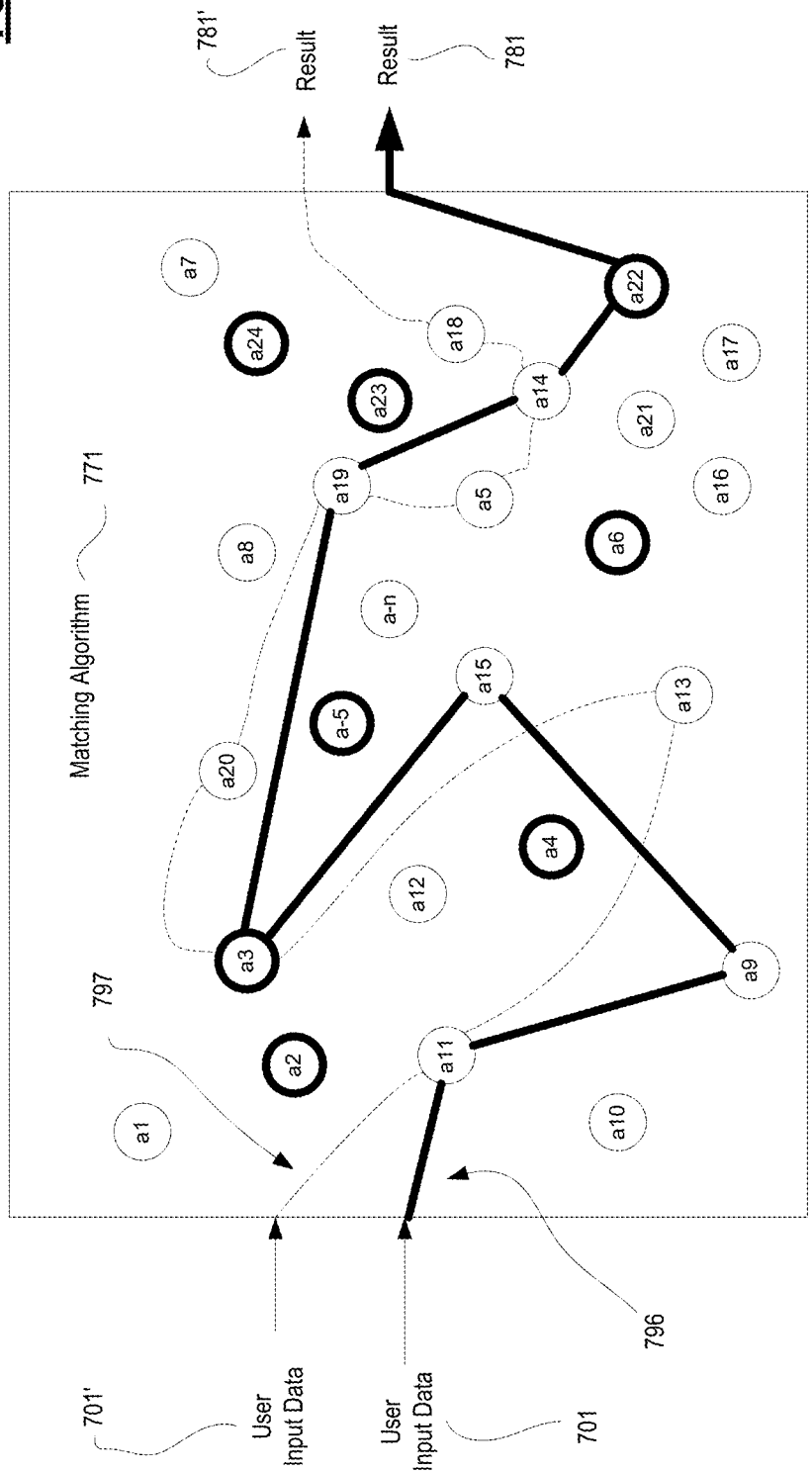
FIG. 7C illustrates the execution of a matching algorithm of a matched scenario in response to user input data, in accordance with one embodiment of the present disclosure.

FIG. 7C is a diagram 700C that illustrates the execution of a matching algorithm 771 of a matched scenario in response to user input data 701, in accordance with one embodiment of the present disclosure. The matching algorithm 771 may include a plurality of possible actions (a1, a2, a3 . . . a-n) to be performed depending on the input data for a given scenario. For instance, user data 701 are input into the matching algorithm 771, wherein the user data are collected in connection with a first user. The matching algorithm 771 is associated with a matched scenario. For example, the scenario may be one centered around the user returning home from work around 7 pm, as used in a previous example.

Execution of the matching algorithm 771 with user input data 701 selects one or more actions as shown by path 796, wherein the actions in path 796 define the result 781. As an illustration, path 796 includes actions a11, a9, a15, a3, a19, a14, and a22. The actions in path 796 are to be performed (e.g., as determined by execution of the matching algorithm) in response to the contextual environment of the user based on the user input data, wherein the contextual environment includes the user returning from work at 7 μm on a Tuesday. Although path 796 shows operations that are sequentially linked and/or performed, other embodiments are well suited to selection of actions in a sequential or non-sequential path (e.g., performing actions simultaneously).

For purposes of illustration, the actions in path 796 may include moving closer to the user to facilitate communication with the user, playing relaxation music while interacting with the user and/or collecting data, and starting a gaming application for interaction by the user. The personal companion may have learned that Tuesday is gaming night for the user, and as such, one of the actions is to start the gaming application (e.g., the last gaming application that the user has interacted with). In addition, an action may include providing notification to the user that a friend, Bobby, has just reached a high score (e.g., between the user and Bobby) in playing the same gaming application that is started, wherein one of the inputs may be the collection and transmission of social networking data from Bobby indicating a high score. In another illustration of an action, a notification may be provided that Bobby is playing a multi-player gaming application, and a query is presented to the user asking whether the user wants to play the multi-player gaming application with Bobby (wherein the multi-player gaming application is started if the answer is "Yes"). In still another illustration of an action, a query may be posed to the user asking whether the user would like to start a video conference with the mother of the user.

At least one of the actions in path 796 includes moving the autonomous personal companion providing services to the user. In path 796, bolded actions a3 and a22 each involve movement of the personal companion. For instance, movement may include positioning the personal companion closer to the user in order to be in a better position for collecting data, or to be in a better position for communicating with the user. In other instances, movement may include following the user, such that as the user moves throughout a room or a house or building, the personal companion also moves with the user. In still other instances, movement may include positioning the personal companion in a location that facilitates projection of images onto a displayable surface (e.g., wall of a room). For example, the personal companion may locate itself in the best position (as previously determined through mapping) for projecting images onto a wall. In that case, the movement and projection of images are separate actions to be performed in path 796.

FIG. 7C also shows a different path 797 as generated by the matching algorithm 771 based on a separate dataset of user input data 701'. In particular, execution of the matching algorithm 771 with user input data 701' selects one or more actions as shown by path 797, wherein the actions in path 797 define the result 781'. As an illustration, path 797 includes actions a11, a13, a3, a20, a19, a5, a14, and a18. The actions in path 797 are to be performed in response to the contextual environment of the user based on the user input data, wherein the contextual environment includes the user returning from work at 7 μm on a Wednesday.

Path 797 may be similar to path 796, but include different actions. For example, data 701' may be from the same user, but on a different day. The scenario may be the same (e.g., user returns home from work at 7 μm), and as such the same matching algorithm 771 is executed. However, the user input 701' is slightly different, in part, because it is a different day, Wednesday. It may have been determined that the user watches a television program X every Wednesday at 7 μm, and as such, on Wednesdays the personal companion takes actions to have that program playing (e.g., on a separate display, or on a display local to the companion). As such, instead of starting a gaming application as one of the action, because it is Wednesday, the television program is started.

In addition, at least one of the actions in path 797 includes moving the autonomous personal companion providing services to the user. In path 797, bolded action a3 involves movement of the personal companion, such as those movements previously described.

In one embodiment, the matching algorithm 771 is used in a different personal companion for a different user. For example, in the same household, there may be two users, each having a unique personal companion that provides services. In this case, the same body of the robot 105 may support two different personal companions. In another example, there may be two users that are completely isolated from each other (e.g., located in different parts of the world). Each of the users has their own personal companion. In both of these cases, the scenario may be similar (e.g., returning home from work at 7 μm, or just returning home from work), and as such a matching algorithm 771 is equally applicable for all of these users. In these cases, the second path 797 provides actions to be performed for the second user as based on the user input data 701'.

Figure 8:
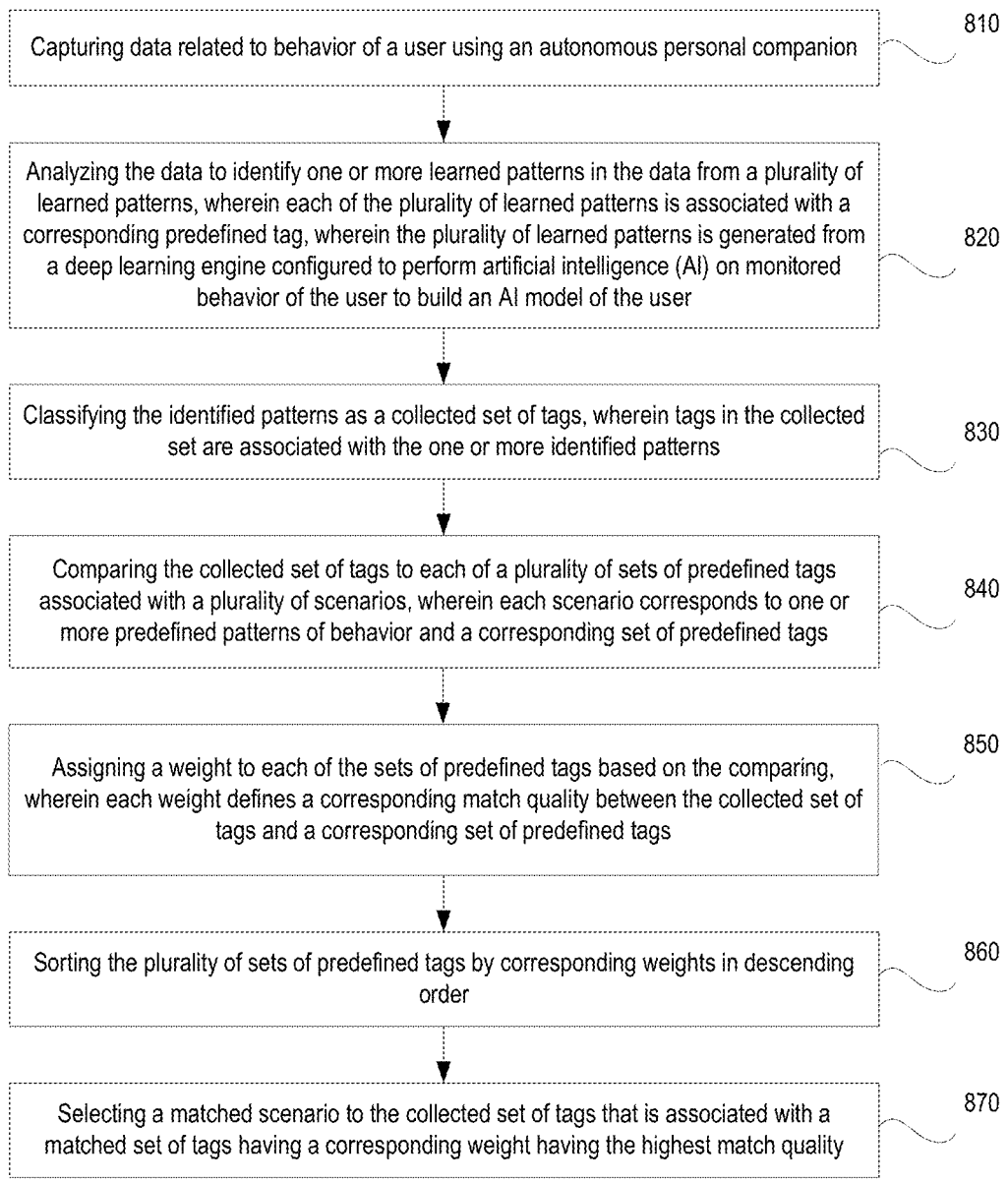
FIG. 8 is a flow diagram illustrating a method for responding to a contextual environment of a user by determining a matching scenario and corresponding algorithm based on identified learned patterns of observed user behavior, in accordance with one embodiment of the present disclosure.

With the detailed description of the various modules of the one or more AI engines communicating over a network, flow diagram 800 of FIG. 8 discloses a method for contextualizing captured user data (e.g., audio and visual data) related to the user and/or the environment of the user in order to provide services by an autonomous personal companion to the user which responds to the contextualization of the captured data, in accordance with one embodiment of the present disclosure. For example, contextualization includes the determination of a matching scenario and corresponding algorithm based on identified learned patterns of observed user behavior. Flow diagram 800 may be implemented within a companion 100 (e.g., within AI engine 190), previously described and/or in combination with a back-end server 140, as previously described.

At 810, the method includes capturing data related to behavior of a user. More particularly, the captured data include data related to the user and/or the environment within which the user is located. For example, the data may include captured audio and visual data related to the user and/or environment. In one embodiment, the data are captured by an autonomous personal companion that provides services for the user.

At 820, the method includes analyzing the data to identify one or more patterns of behavior in the data that can be associated with a plurality of predefined or learned patterns. That is, the identified patterns may be similar to previously defined learned patterns that are built using artificial intelligence on monitored data of a plurality of users, including the user. Further, each of the plurality of predefined learned patterns is associated with a corresponding predefined tag.

More particularly, an AI model of the user may be built based on the plurality of predefined or learned patterns that is adapted to predict, in part, the behavior, biometrics, actions, emotions, expectations, desires, likes, wants, needs, etc. of the user. For instance, the local AI model is built by accessing data related to monitored behavior of the user, and by accessing data related to monitored behavior of a plurality of users. The plurality of predefined or learned patterns is determined, wherein the predefined or learned patterns can be used to predict behavior of the user by performing AI on the monitored behavior of the user and the plurality of users, such as when determining a scenario providing contextualization of the user behavior. More particularly, the predefined or learned patterns may be used to define the contextual environment of the user, from which especially within a given environment or scenario experienced or driven by the user, may be determined predictions of the responses, actions, behaviors, wants and/or needs of the user for a given set of inputs (e.g., the captured data). As a result, the AI model of the user may be built based on the predefined or learned patterns that are adapted to the user.

At 830, the method includes classifying the identified patterns as a collected set of tags, wherein tags in the collected set are associated with the one or more identified patterns. That is, the identified patterns in the captured data can be defined by or associated with tags, wherein each identified pattern can be classified with its corresponding tag. In one embodiment, the tags are generated based on the identified patterns. That is, the identified patterns are compartmentalized in such a manner that tags used to describe those patterns may be generically generated. In other embodiments, tags from a pool of tags are used to define the identified patterns, wherein the pool of tags are associated with the previously defined learned patterns that are built using artificial intelligence. As such, the identified patterns are further defined by tags, which have been previously generated in association with learned patterns built using artificial intelligence, as previously described.

At 840, the method includes comparing the collected set of tags to each of a plurality of sets of predefined tags associated with a plurality of scenarios, wherein each scenario corresponds to one or more predefined patterns of behavior and a corresponding set of predefined tags, as previously described. Based on the predefined or learned patterns built using artificial intelligence, a plurality of scenarios can be built, wherein the plurality of scenarios is associated with a plurality of sets of predefined tags. In particular, each scenario is defined by a set of predefined or learned patterns, and the set of predefined or learned patterns corresponds to a set of predefined tags. Each scenario may provide contextualization of the corresponding user behavior that is identified.

At 850, the method includes assigning a weight to each of the sets of predefined tags based on the comparing. Each weight defines a corresponding match quality between the collected set of tags and a corresponding set of predefined tags. For example, the weight may be a sorting factor indicating a quality of the match between the collected set of tags to a corresponding set of predefined tags associated with a particular scenario. As such, at 860, the plurality of sets of predefined tags may be sorted by the corresponding weights in descending order. At 870, the method includes selecting a matched scenario for the collected set of tags that is associated with a matched set of predefined tags having a corresponding weight having the highest match quality. That is, the resultant scenario is selected quasi-randomly based on a scenario order or sorting score, as previously described in 860.

A matched algorithm of the matched scenario can be executed given the captured data to determine an outward behavior of the AI as implemented through a corresponding personal companion, which can be used to respond to the captured data. For example, the captured data are provided as input into the matched algorithm of the matched scenario, which is executed to generate a result—the determined behavior of the AI, which when performed responds to the predicted wants and/or needs (e.g., based on the matched scenario) of the user based on the captured user input. In particular, the local AI model of the user includes a plurality of algorithms generated by the deep learning engine, wherein each algorithm can be executed to provide a response for a corresponding scenario that can be identified and/or matched based on certain input data. That is, for any given contextual environment of a user, the local AI model of the user can determine an appropriate response for the environment. In particular, captured user data can be contextualized, by classifying the captured user data using tags, and matching the tags to tags of previously defined learned patterns generated through deep learning, and determining a matched scenario which provides the contextualization of the captured user data. The matching algorithm for the matched scenario provides the proper response to the contextualization. For example, input data may analyzed to determine a user context using tags, such as time of day is 7 pm, user returning from work, or user sitting on couch, which then provides a result indicating that user desires relaxation music to be broadcast through the room. In addition, user data may be analyzed to determine patterns of user behavior, such as determining that the user always returns from work at 7 pm, and desired relaxation music.

Further, the method includes performing one or more actions based on the result (e.g., outward behavior of the AI as implemented by the personal companion) in response to the captured data. For example, the actions are selected through execution of the matching algorithm. Using the example provided above, the result indicates that the user typically desires relaxation music at the end of the day when returning home. Therefore, the action required to be performed by the autonomous personal companion includes broadcasting through its own audio speakers some digital content that is relaxing (e.g., music, music video, mediating background music, etc.). Additional actions may also be performed in support of the result. For example, a pattern of lights known to promote relaxation may be projected from the personal companion onto a wall, or into the general environment of the user. Also, the pattern of lights may be displayed on the personal companion.

At least one of the actions involves moving the autonomous personal companion. As previously described for illustration purposes only, movement may include positioning the personal companion closer to the user in order to be in a better position for collecting data, or to be in a better position for communicating with the user; following the user, such that as the user moves throughout a room or a house or building, the personal companion also moves with the user; positioning the personal companion in a location that facilitates projection of images onto a displayable surface (e.g., wall of a room); etc.

In summary, embodiments of the present disclosure provide for the contextualization of captured user data (e.g., audio and visual data) that relates to the behavior of the user and/or the environment of the user. Contextualization is determined by classifying the captured user data using tags, and matching the tags to tags of previously defined learned patterns generated through deep learning. That is, a matching scenario providing contextualization can be determined based on the combination of matched tags, wherein the matching scenario has a corresponding algorithm. Execution of the matched algorithm given the captured data as input generates a result (e.g., outward behavior of AI as implemented through a personal companion), which when performed responds to the captured user data.

In one embodiment, a scenario change is determined while a current scenario is active. In particular, the scenario selection process outlined in FIG. 8 continuously operates. For example, the method includes collecting the data on a continual basis. In that manner, a change of context can be determined based on the collected tags that are updated, i.e., an updated collected set of tags. The method includes comparing the updated collected set of tags to each of the plurality of sets of predefined tags associated with the plurality of scenarios, previously introduced. An updated weight is assigned to each of the sets of predefined tags based on the comparing. The plurality of sets of predefined tags is sorted by the corresponding updated weights in descending order. The method includes selecting an updated matched scenario to the updated collected set of tags that is associated with an updated matched set of predefined tags having a corresponding updated weight with the highest match quality. That is, as soon as a new scenario score is greater than the current scenario score, a scenario switch is executed. In addition, a "stickiness" factor may be considered, such that a current scenario score may remain the scenario even if the new scenario score is greater when a stickiness factor indicates that the current scenario has priority. For example, the stickiness factor may elevate the weight of the current scenario, or provide a period of time before the current scenario can expire.

In particular, with the scenario change, the user input is continually changing. That is, the context of the user continually changes, and as such, the related scenario defining the context is continually updated. Embodiments of the present disclosure provide for dynamically switching between scenario algorithms based on a target (e.g., user) and the changing contextualization of the captured data (e.g., visual and audio data) into tags. For instance, the captured data are collected on a continual basis. A change of context may be determined based on the collected tags that are updated. For example, tags may be generally grouped together, such that a first tag is generally associated with a second tag, but not with a third tag. Tags may be grouped together through general association from which it may be determined that a change in context has or is occurring. Additionally, a grouping of tags may be learned through artificial intelligence as being associated with a change of context. The collected tags, previously described, may be separated as a first collected subset of tags, which correspond to the matched scenario. In addition, the remainder of the collected tags may be defined as a second collected subset of tags.

The second collected subset of tags may be associated with another context and/or another scenario. In particular, the second collected subset of tags is compared to tags in the plurality of sets of predefined tags. In addition, the second collected subset of tags is matched to a second matched set of predefined tags based on the comparing, wherein the second matched set of predefined tags corresponds to a second matched scenario. The second matched scenario is associated with a second matched algorithm.

Further, algorithms for execution may be switched from the matched algorithm to the second matched algorithm corresponding to the second matched scenario. Also, the captured data, or a subset of the captured data corresponding to the second collected subset of tags, may be input to the second matched algorithm to generate a second result. The autonomous personal companion of the user may perform a second action based on the second result in response to the captured data, or a subset of the captured data corresponding to the second collected subset of tags.

In one embodiment, the input data may be classified based on at least one of the collected tags. In particular, the captured input data may be audio data. The audio data may be classified as one of command speech, background scenario speech, and conversation speech. Depending on the classification, the response may be aligned to the classification. For example, if the audio data are classified as being a command type of speech, the response from the autonomous personal companion may be reflective of a particular command. For example, if the command speech is related to a query asking who won the game last night (e.g., a previously introduced example), the appropriate response would be an answer to the query. In addition, if the audio data are classified as being conversation speech, the appropriate response would be additional conversation speech (e.g., to continue a recognized topic of conversation). Also, if the audio data are classified as being background speech, there may be no appropriate response, such that the personal companion continues to monitor the user data until an appropriate context is determined that requires an active response.

In still another embodiment, the captured input data may be matched to a scenario that defines an emotional state of the user (e.g., happy, sad, distraught, contemplative, etc.) based on at least one of the collected tags. Based on the determined emotional state, an appropriate response may be provided. For example, a therapeutic response may be provided by the autonomous personal companion to the user. For example, if it is determined that the user is sad—as an emotion, the personal companion may provide audio (e.g., music) and lighting that is known to cheer up the user. The audio may be transmitted using any form (e.g., at various frequencies including ultrasonic, subsonic, sonic, etc.). In another example, the response may be for the personal companion to display a short video clip that the user particularly enjoys, thereby providing happiness to the user. In still another embodiment, the response may be to animate the personal companion in a way to cheer up the user. For instance, the personal companion may exhibit a pattern of lighting, or act in a funny manner through lighting, movement, sound, etc. That is, a pattern of lighting intended to cheer up the user, may also be transformed into a series of movements to animate the personal companion in a manner intended to cheer up the user. In that manner, the personal companion may produce an effect on the user, which in one example, helps the emotional state of the user change from sad to happy.

In one embodiment, the autonomous personal companion may be configured to provide various forms of teaching or tutoring. For example, the personal companion may be configured to provide math tutoring, and performs actions as responses to captured user data that are associated with a tutoring session (e.g., user studying a problem, user asking clarifying questions, user indicating understanding of concept, user indicating no understanding of concept, etc.). In one illustration, the personal companion may be configured to teach music, such as piano or guitar lessons. As such, the personal companion may similarly perform the actions and teachings provided by a human instructor.

In another embodiment, the matched scenario may be used to classify a threat level of the user based on at least one of the collected tags. In other words, the threat level defines how receptive the user is to responses by the autonomous personal companion in the given contextual environment of the user. For example, if the threat level indicates that the user is very receptive, then the personal companion may perform the action for a determined scenario. On the other hand, if the threat level indicates that the user is not very receptive (e.g., busy with work, rushed to get out of the house to make a movie show time, angry, etc.), then the personal companion may not perform the action for a determined scenario. Other intermediate threat levels may be associated with modified actions to be performed by the autonomous personal companion.

Accordingly, in various embodiments the present disclosure describes systems and methods for the contextualization of captured user data that relate to the user and/or the environment of the user by classifying the captured user data using tags, and matching the tags to tags of previously defined learned patterns generated through deep learning, wherein a matching scenario can be determined based on the combination of matched tags, wherein the matching scenario has a corresponding algorithm, and wherein execution of the matched algorithm given the captured data as input generates a result, which when performed responds to the captured user data.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

With the above embodiments in mind, it should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the disclosure also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and embodiments of the present disclosure are not to be limited to the details given herein, but may be modified within the scope and equivalents of the appended claims.

What is claimed is:

1. A method, comprising:
capturing global data related to behaviors of a plurality of users and a plurality of contextual environments experienced by the plurality of users;
generating a plurality of predefined patterns for the behaviors and the plurality of contextual environments using a deep learning engine processing the global data that are captured and provided as input, wherein the plurality of predefined patterns is associated with a plurality of predefined tags;
capturing local data related to behavior of a user and an environment of the user at an autonomous and robotic personal companion providing services to the user, wherein movement of the autonomous and robotic personal companion when capturing the local data is independent of control from the user;
analyzing at a server the local data to identify patterns of user behavior and a contextual environment of the user from the plurality of predefined patterns, wherein each of the plurality of predefined patterns is associated with a corresponding predefined tag;
classifying at the server the patterns of user behavior and the contextual environment that are identified as a collected set of tags, wherein tags in the collected set are associated with the patterns of user behavior and the contextual environment that are identified;
comparing at the server the collected set of tags to each of a plurality of sets of predefined tags associated with a plurality of scenarios, wherein each scenario corresponds to predefined patterns of user behavior within a corresponding contextual environment, wherein the each scenario includes a corresponding set of predefined tags;
assigning at the server a weight to the each of the plurality of sets of predefined tags based on the comparing the collected set of tags to the each of the plurality of sets of predefined tags, wherein each weight defines a corresponding match quality between the collected set of tags and the corresponding set of predefined tags;
selecting at the server a matched scenario to the collected set of tags, wherein the matched scenario is associated with a matched set of predefined tags having a corresponding weight with a highest match quality;
executing at the server a matched algorithm of the matched scenario with the local data that are captured to generate a result, wherein each of the plurality of scenarios has a corresponding algorithm; and
automatically controlling the autonomous and robotic personal companion to perform an action based on the result for interacting with the user and without selection of the action by the user.

2. The method of claim 1, further comprising:
providing the local data that are captured as input into the matched algorithm of the matched scenario to determine a behavior associated with the personal companion; and
performing one or more actions based on the behavior that is determined, wherein at least one action includes moving the personal companion.

3. The method of claim 2, wherein the providing the local data that are captured as the input into the matched algorithm includes:
determining an emotional state of the user based on at least one of the collected set of tags; and
providing a therapy based on the emotional state as one of the one or more actions.

4. The method of claim 2, wherein the providing the local data that are captured as the input into the matched algorithm further comprises:
determining an emotional state of the user based on at least one of the collected set of tags; and
providing animation of an object reflecting the emotional state as one of the one or more actions.

5. The method of claim 2, further comprising:
determining when moving that the autonomous and robotic personal companion is approaching a private zone in physical space; and
preventing the personal companion from entering the private zone.

6. The method of claim 2, further comprising:
positioning the autonomous and robotic personal companion closer to the user when performing the moving.

7. The method of claim 2, further comprising:
following the user when performing the moving.

8. The method of claim 2, further comprising:
positioning the autonomous and robotic personal companion when moving to project images from the personal companion onto a displayable surface; and
projecting the images as one of the one or more actions.

9. The method of claim 2, wherein the matched algorithm selects the one or more actions to be performed from a plurality of possible actions.

10. The method of claim 2, further comprising:
starting a gaming application for play by the user as one of the one or more actions.

11. The method of claim 1, wherein the generating the plurality of predefined patterns includes:

accessing data related to monitored behavior of a plurality of users;
determining the plurality of predefined patterns based on the data related to monitored behavior of a plurality of users.

12. The method of claim 1, further comprising:
collecting the local data on a continual basis;
determining a change of context based on the collected set of tags that are updated;
comparing the collected set of tags that is updated to the each of the plurality of sets of predefined tags associated with the plurality of scenarios;
assigning an updated weight to the each of the plurality of sets of predefined tags based on the comparing;
sorting the plurality of sets of predefined tags by corresponding updated weights in descending order; and
selecting an updated matched scenario to the collected set of tags that is updated and that is associated with an updated matched set of predefined tags having a corresponding updated weight with the highest match quality.

13. The method of claim 1, further comprising:
setting an expiration period for each of a plurality of algorithms of the plurality of scenarios, wherein execution of a corresponding algorithm given the local data that are captured as input data provides the action to be taken by the autonomous and robotic personal companion.

14. The method of claim 1, further comprising:
determining audio data from the local data that are captured based on at least one of the collected set of tags;
classifying the audio data into one of command speech, background scenario speech, and conversation speech; and
aligning the matched scenario with the audio data that is classified.

15. A non-transitory computer-readable medium storing a computer program for implementing a method, the computer-readable medium comprising:
program instructions for capturing global data related to behaviors of a plurality of users and a plurality of contextual environments experienced by the plurality of users;
program instructions for generating a plurality of predefined patterns for the behaviors and the plurality of contextual environments using a deep learning engine processing the global data that are captured and provided as input, wherein the plurality of predefined patterns is associated with a plurality of predefined tags;
program instructions for capturing local data related to behavior of a user and an environment of the user at an autonomous and robotic personal companion providing services to the user, wherein movement of the autonomous and robotic personal companion when capturing the local data is independent of control from the user;
program instructions for analyzing at a server the local data to identify patterns of user behavior and a contextual environment of the user from the plurality of predefined patterns, wherein each of the plurality of predefined patterns is associated with a corresponding predefined tag;
program instructions for classifying at the server the patterns of user behavior and the contextual environment that are identified as a collected set of tags, wherein tags in the collected set are associated with the patterns of user behavior and the contextual environment that are identified;
program instructions for comparing at the server the collected set of tags to each of a plurality of sets of predefined tags associated with a plurality of scenarios, wherein each scenario corresponds to predefined patterns of user behavior within a corresponding contextual environment, wherein each scenario includes a corresponding set of predefined tags;
program instructions for assigning at the server a weight to the each of the plurality of sets of predefined tags based on the comparing the collected set of tags to the each of the plurality of sets of predefined tags, wherein each weight defines a corresponding match quality between the collected set of tags and the corresponding set of predefined tags;
program instructions for selecting at the server a matched scenario to the collected set of tags, wherein the matched scenario is associated with a matched set of predefined tags having a corresponding weight with a highest match quality;
program instructions for executing at the server a matched algorithm of the matched scenario with the local data that are captured to generate a result, wherein each of the plurality of scenarios has a corresponding algorithm; and
program instructions for automatically controlling the autonomous and robotic personal companion to perform an action based on the result for interacting with the user and without selection of the action by the user.

16. The computer-readable medium of claim 15, further comprising:
program instructions for providing the local data that are captured as input into the matched algorithm of the matched scenario to determine a behavior associated with the personal companion; and
program instructions for performing one or more actions based on the behavior that is determined, wherein at least one action includes moving the personal companion.

17. The computer-readable medium of claim 16, further comprising:
program instructions for determining an emotional state of the user based on at least one of the collected set of tags;
program instructions for performing the one or more actions based on the emotional state; and
program instructions for not performing the one or more actions based on the emotional state.

18. The computer-readable medium of claim 15, further comprising:
program instructions for collecting the local data on a continual basis;
program instructions for determining a change of context based on the collected set of tags that are updated;
program instructions for comparing the collected set of tags that is updated to the each of the plurality of sets of predefined tags associated with the plurality of scenarios;
program instructions for assigning an updated weight to the each of the plurality of sets of predefined tags based on the comparing;
program instructions for sorting the plurality of sets of predefined tags by corresponding updated weights in descending order; and program instructions for selecting an updated matched scenario to the collected set of predefined tags that is updated and that is associated with an updated matched set of tags having a corresponding updated weight having the highest match quality.

19. The computer-readable medium of claim 15, further comprising:
program instructions for setting an expiration period for each of a plurality of algorithms of the plurality of scenarios, wherein execution of a corresponding algorithm given the local data that are captured as input data provides the action to be taken by the autonomous and robotic personal companion.

20. A computer system comprising:
a processor; and
memory coupled to the processor and having stored therein instructions that, if executed by the computer system, cause the computer system to execute a method for automatically controlling an autonomous and robotic personal companion comprising:
capturing global data related to behaviors of a plurality of users and a plurality of contextual environments experienced by the plurality of users;
generating a plurality of predefined patterns for the behaviors and the plurality of contextual environments using a deep learning engine processing the global data that are captured and provided as input, wherein the plurality of predefined patterns is associated with a plurality of predefined tags;
capturing local data related to behavior of a user and an environment of the user at an autonomous and robotic personal companion providing services to the user, wherein movement of the autonomous and robotic personal companion when capturing the local data is independent of control from the user;
analyzing at a server the local data to identify patterns of user behavior and a contextual environment of the user from the plurality of predefined patterns, wherein each of the plurality of predefined patterns is associated with a corresponding predefined tag;
classifying at the server the patterns of user behavior and the contextual environment that are identified as a collected set of tags, wherein tags in the collected set are associated with the patterns of user behavior and the contextual environment that are identified;
comparing at the server the collected set of tags to each of a plurality of sets of predefined tags associated with a plurality of scenarios, wherein the each scenario corresponds to predefined patterns of user behavior within a corresponding contextual environment, wherein each scenario includes a corresponding set of predefined tags;
assigning at the server a weight to the each of the plurality of sets of predefined tags based on the comparing the collected set of tags to the each of the plurality of sets of predefined tags, wherein each weight defines a corresponding match quality between the collected set of tags and the corresponding set of predefined tags;
selecting at the server a matched scenario to the collected set of tags, wherein the matched scenario is associated with a matched set of predefined tags having a corresponding weight with a highest match quality;
executing at the server a matched algorithm of the matched scenario with the local data that are captured to generate a result, wherein each of the plurality of scenarios has a corresponding algorithm; and
automatically controlling the autonomous and robotic personal companion to perform an action based on the result for interacting with the user and without selection of the action by the user.

21. The computer system of claim 20, wherein the method further comprises:
providing the local data that are captured as input into the matched algorithm of the matched scenario to determine a behavior associated with the personal companion; and
performing one or more actions based on the behavior that is determined, wherein at least one action includes moving the personal companion.

22. The computer system of claim 21, wherein the method further comprises:
collecting the local data on a continual basis;
determining a change of context based on the collected set of tags that are updated;
comparing the collected set of tags that is updated to the each of the plurality of sets of predefined tags associated with the plurality of scenarios;
assigning an updated weight to the each of the plurality of sets of predefined tags based on the comparing;
sorting the plurality of sets of predefined tags by corresponding updated weights in descending order; and
selecting an updated matched scenario to the collected set of predefined tags that is updated and that is associated with an updated matched set of tags having a corresponding updated weight having the highest match quality.

* * * * *